US012464309B1

(12) United States Patent
Welch et al.

(10) Patent No.: US 12,464,309 B1
(45) Date of Patent: Nov. 4, 2025

(54) SPATIALLY EXPLICIT AUDITORY CUES FOR ENHANCED SITUATIONAL AWARENESS

(71) Applicant: University of Central Florida Research Foundation, Inc., Orlando, FL (US)

(72) Inventors: Gregory Welch, Orlando, FL (US); Gerd Bruder, Orlando, FL (US); Zubin Choudhary, Orlando, FL (US)

(73) Assignee: University of Central Florida Research Foundation, Inc., Orlando, FL (US)

(*) Notice: Subject to any disclaimer, the term of this patent is extended or adjusted under 35 U.S.C. 154(b) by 0 days.

(21) Appl. No.: 19/047,151

(22) Filed: Feb. 6, 2025

Related U.S. Application Data

(63) Continuation of application No. 18/756,382, filed on Jun. 27, 2024.

(60) Provisional application No. 63/510,521, filed on Jun. 27, 2023.

(51) Int. Cl.
| | |
|---|---|
| *H04S 7/00* | (2006.01) |
| *G08G 1/0967* | (2006.01) |
| *G10K 15/02* | (2006.01) |
| *H04R 5/033* | (2006.01) |

(52) U.S. Cl.
CPC .............. *H04S 7/304* (2013.01); *G10K 15/02* (2013.01); *H04R 5/033* (2013.01); *H04S 7/307* (2013.01); *G08G 1/096766* (2013.01); *H04R 2499/13* (2013.01); *H04S 2400/11* (2013.01); *H04S 2400/13* (2013.01); *H04S 2400/15* (2013.01); *H04S 2420/01* (2013.01)

(58) Field of Classification Search
None
See application file for complete search history.

(56) References Cited

U.S. PATENT DOCUMENTS

| | | | |
|---|---|---|---|
| 11,589,184 B1* | 2/2023 | Mont-Reynaud | ....... H04S 7/304 |
| 2015/0326966 A1* | 11/2015 | Mehra | ....... H04R 1/20 |
| | | | 367/138 |
| 2017/0188168 A1* | 6/2017 | Lyren | ....... H04R 5/04 |
| 2017/0195816 A1* | 7/2017 | Shih | ....... H04S 7/307 |

(Continued)

FOREIGN PATENT DOCUMENTS

WO  WO-2018234625 A1 * 12/2018 .......... H04R 29/005

*Primary Examiner* — Qin Zhu
(74) *Attorney, Agent, or Firm* — Anton J. Hopen; Smith & Hopen, P. A.

(57) ABSTRACT

The invention provides a system for generating spatially explicit auditory cues for a recipient. It includes a processor to receive real-time location data of multiple physical entities relative to the recipient's spatial position and visual orientation. An audio generation module transforms this data into distinct audio signals using Head-Related Transfer Functions (HRTFs) to simulate perceived direction and distance. The output device, such as a headset or vehicle speakers, presents these audio signals spatially to allow perception of entities' relative locations. The system can adjust volume based on entity distance, integrate Doppler effects to indicate motion, and mute entities outside predefined distance boundaries. It also supports above-ground and ground assets, with altitude information converted to audible cues. The system monitors the recipient's orientation in real-time to adjust the HRTFs accordingly.

16 Claims, 27 Drawing Sheets

(56) References Cited

U.S. PATENT DOCUMENTS

| | | | |
|---|---|---|---|
| 2017/0359467 A1* | 12/2017 | Norris | H04S 7/305 |
| 2018/0014140 A1* | 1/2018 | Milevski | H04S 7/304 |
| 2018/0046431 A1* | 2/2018 | Thagadur Shivappa | G06F 3/16 |
| 2019/0278552 A1* | 9/2019 | Lyren | H04S 7/303 |
| 2020/0209957 A1* | 7/2020 | Sztuk | H04N 7/157 |
| 2020/0368616 A1* | 11/2020 | Delamont | H04N 13/239 |
| 2020/0388068 A1* | 12/2020 | Yeung | G06N 20/00 |
| 2022/0187094 A1* | 6/2022 | Andrew | G01C 21/3679 |
| 2023/0125654 A1* | 4/2023 | Sha | H04S 7/304 |
| | | | 700/94 |
| 2023/0292078 A1* | 9/2023 | Bove, Jr. | G02B 27/017 |
| 2023/0328471 A1* | 10/2023 | Singh | H04S 7/302 |
| | | | 381/303 |
| 2024/0305951 A1* | 9/2024 | Francl | G02B 27/0093 |
| 2024/0334112 A1* | 10/2024 | Treat | H04R 5/033 |
| 2024/0334149 A1* | 10/2024 | Treat | H04S 7/304 |
| 2024/0430636 A1* | 12/2024 | Tsuruga | G10L 25/51 |
| 2025/0220386 A1* | 7/2025 | Norris | H04S 1/007 |

* cited by examiner

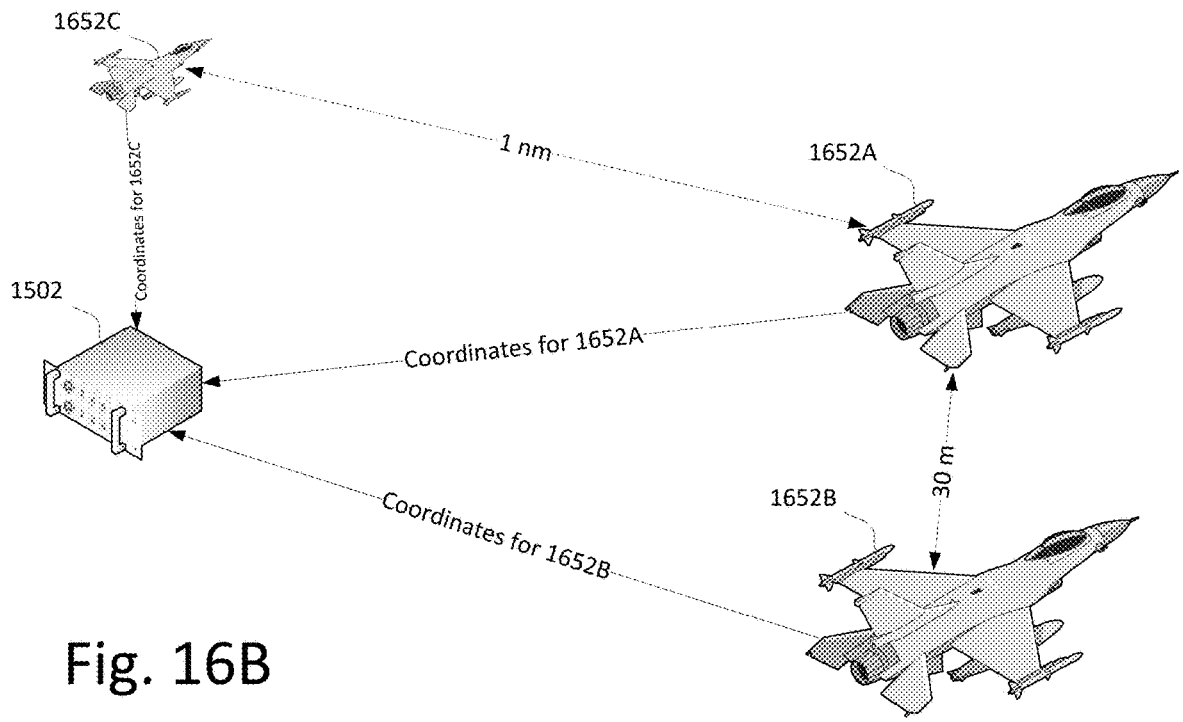
Fig. 16B
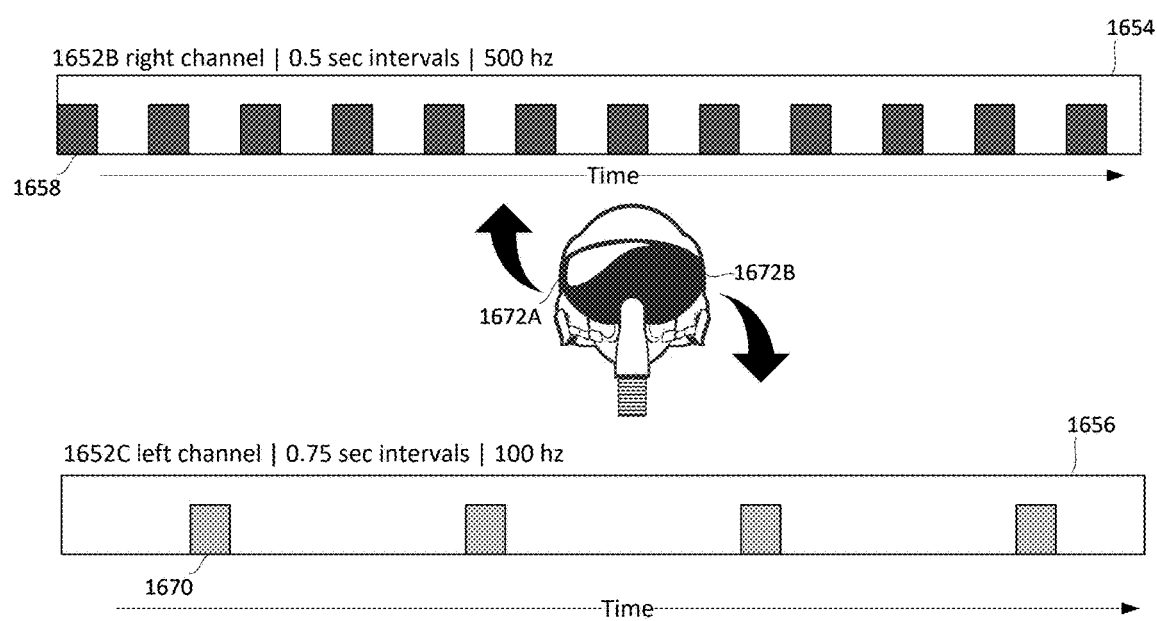

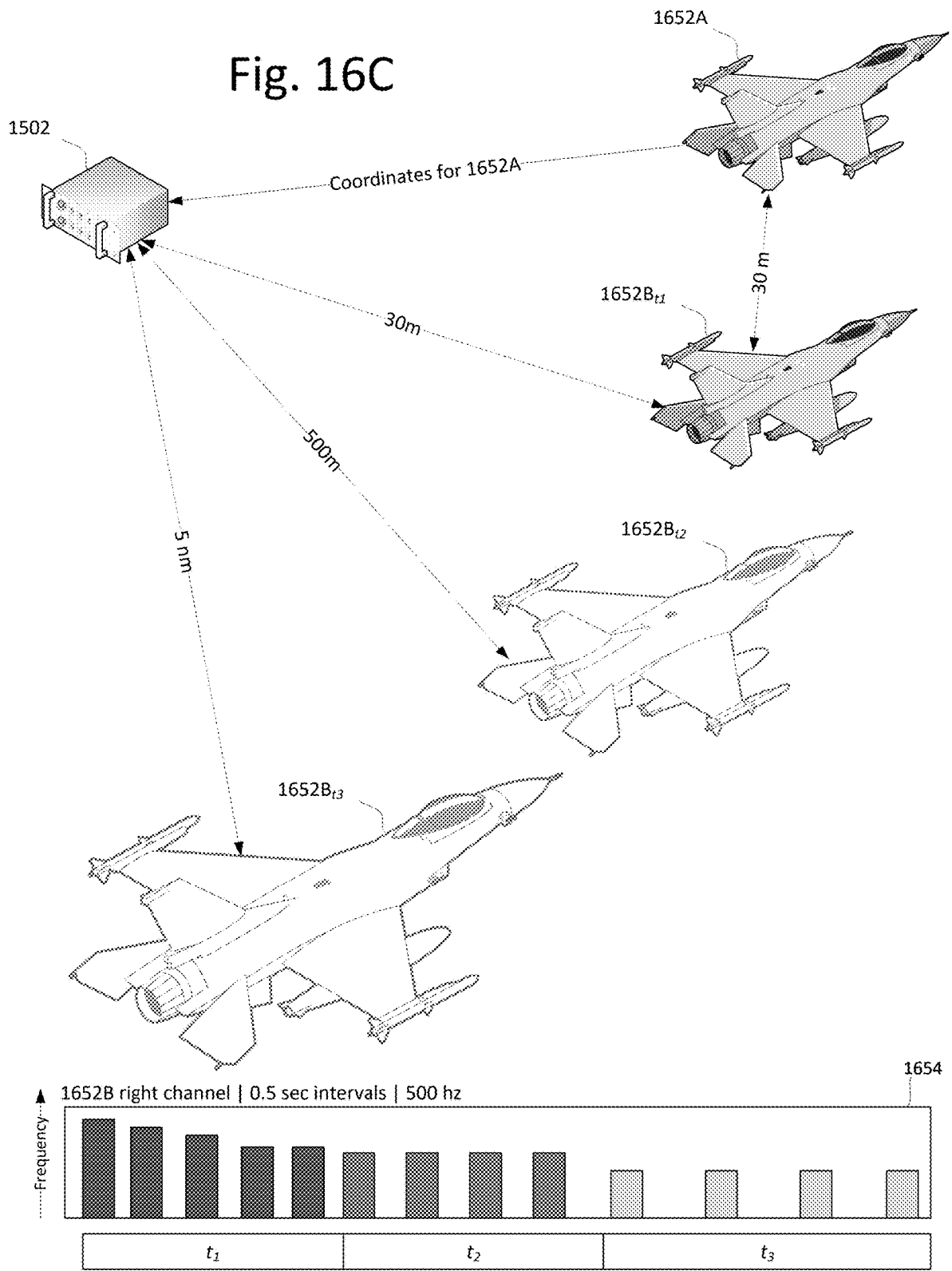

SPATIALLY EXPLICIT AUDITORY CUES FOR ENHANCED SITUATIONAL AWARENESS

PRIORITY CLAIM

This application claims priority to U.S. Non-Provisional patent application Ser. No. 18/756,382 filed Jun. 27, 2024 and entitled "Spatially Explicit Auditory Cues for Enhanced Situational Awareness" which, in turn, claims priority to U.S. Provisional Patent Application 63/510,521 filed Jun. 27, 2023 and entitled "Advanced Speech Clarity Through Visual Cues Enhancement."

GOVERNMENT INTEREST

This invention was made with Government support under Grant No. N000142112578 awarded by the Office of Naval Research. The Government has certain rights in the invention.

BACKGROUND OF THE INVENTION

1. Field of the Invention

The field of this invention relates to communication technology, specifically, systems and methods for enhancing spatial awareness of physical objects through synthetically generated spatial audio.

2. Brief Description of the Related Art

Verbal communication, the fundamental cornerstone of human interaction, occurs when two parties exchange information using spoken words. This interaction may transpire face-to-face or be facilitated via technology in the form of voice calls, video calls, or other mediated communication methods. Similarly, sound emanating from or associated with a physical entities (e.g., tangible, non-virtual objects) such as a vehicle, can convey information about its state and behavior, e.g., its position, direction, and speed. At its core, such communication involves a sender, who initiates the communication by sender, e.g., a person speaking or an object emanating sound and a receiver, who perceives and processes the spoken words or other sounds. However, this communicative process can often be hindered by various forms of noise, which can affect the receiver's comprehension of the message, making it slower, more difficult, or even entirely incorrect.

The term 'noise' in this context refers to any unwanted additions or unintentional signal transformations that distort the original message or make it harder to comprehend. Additive noise is one form of such interference, which often arises from the surrounding environment. This could be background noise near the sender, such as the bustling sound in a busy street or the constant hum in a packed office, or even noise near the receiver, such as the rustling of papers or the whirring of a fan. Additive noise can also emerge during the transmission of the message. For example, static interference in a phone call, background chatter in a noisy room, or even the sound of wind in an outdoor setting could be sources of additive noise.

Another type of noise that can impede communication is multiplicative noise. This type of interference can manifest in various forms, such as physical barriers that disrupt the free flow of sound, or the spatial distance between the sender and the receiver, which can attenuate the signal, making it weaker and harder to perceive. Poor articulation by the sender, whereby words are not pronounced distinctly, can further distort the signal and make comprehension challenging for the receiver. Accents, too, can introduce multiplicative noise. An accent unfamiliar to the receiver can make it difficult for them to understand the spoken words accurately. Lastly, auditory disorders, including hearing impairments and conditions like tinnitus, can contribute to multiplicative noise by distorting the perceived sound, causing the message to be misunderstood or missed entirely.

Despite these challenges, when the sender and receiver are physically close or communicating via video, a wealth of visual cues can supplement the spoken words and provide critical information to aid in comprehension. One such visual cue is the movement of the sender's lips. Lip-reading, a skill often employed by individuals with hearing impairments, allows the receiver to interpret spoken words based on how the sender's lips move. This can be particularly helpful in noisy environments where the spoken words are drowned out by background noise.

Facial expressions provide another visual cue. The human face is capable of expressing a wide range of emotions, and these expressions often accompany and enhance verbal communication. For instance, a smile can indicate happiness, approval, or agreement, while a frown may signal disapproval, disagreement, or confusion. By observing the sender's facial expressions, the receiver can glean additional information about the context and emotional content of the spoken words, leading to a deeper and more accurate understanding of the message.

The sender's upper body movements, particularly those associated with breathing, also provide visual cues. The rhythm, depth, and speed of the sender's breathing can indicate their emotional state. Rapid, shallow breathing may suggest anxiety or excitement, while slow, deep breathing could indicate calmness or relief. Observing these cues allows the receiver to gauge the sender's emotional state, providing further context to the spoken words.

Hand gestures and dynamic body postures are other vital visual cues. Gestures can emphasize certain parts of the message, indicate the size or shape of objects, or even replace spoken words entirely in some instances. Similarly, body posture can reveal information about the sender's attitude, confidence level, and emotional state.

In summary, verbal communication is a multifaceted process involving not just the exchange of spoken words, but also the perception and interpretation of various visual cues. Despite potential hindrances like additive and multiplicative noise, the availability of these visual cues in face-to-face or video-mediated communication can greatly enhance the receiver's comprehension of the message, making the communication more effective and accurate. Therefore, it's crucial to consider these factors in any form of verbal communication, as they play a significant role in how messages are conveyed and understood.

BRIEF SUMMARY OF THE INVENTION

An embodiment of the invention currently claimed pertains to a system for generating spatially explicit auditory cues designed to enhance situational awareness for a recipient. This system comprises a processor configured to receive real-time location data of at least one real-world, non-virtual, physical entity relative to the spatial position and visual sight orientation of the recipient. The location data includes directional bearing, distance, and visual focus trajectory of the entity, which are resolved by directional or positional sensors or instruments conveying the spatial data on the entities. An audio generation module processes this location and focus data to create audio signals that simulate the perceived direction, distance, and focus trajectory.

The system is designed to transform this data into audio signals that include several key components. First, there are audio intervals corresponding to the distance, where an entity closer to the recipient produces shorter intervals, while an entity farther away produces longer intervals. Second, the system modulates audio gain to correspond to the distance; closer entities produce audio signals with higher gain, whereas entities that are farther away produce audio signals with lower gain. Specifically, the audio gain is adjusted with respect to decibel levels: a closer entity may have a higher gain level, for instance, up to +20 dB, while an entity farther away might have a gain level reduced to −20 dB.

Furthermore, the audio signals are characterized by frequency levels that provide additional spatial cues. The frequency of the audio signals ranges between 50 Hz to 150 Hz for entities that are farther away, and between 800 Hz to 1,200 Hz for entities that are closer to the recipient. The frequency is adjusted dynamically based on the focus trajectory of the entity, increasing as the entity faces towards the recipient and decreasing as the entity faces away. This dynamic adjustment helps in providing intuitive auditory feedback about the spatial orientation and attention direction of nearby entities.

In addition to frequency and gain modulation, the system incorporates a Doppler effect to adjust the frequency and wavelength of the audio signals. This simulates relative motion between the recipient and the entity, providing a realistic auditory experience that mirrors the actual movement and speed of the entities in relation to the recipient. The Doppler effect is particularly useful in scenarios where the entities are in motion, such as during flight operations or vehicular movements, where it can simulate the characteristic change in pitch of a moving sound source.

The location data for this system is derived from a combination of inputs, ensuring accuracy and reliability. These inputs include global positioning systems (GPS), radio signals, sound signals, optically received data, and audibly received data. The system is capable of integrating data from these diverse sources to provide comprehensive spatial awareness. For above-ground assets, altitude information is converted into audible cues by adjusting the spectral composition of the sound, allowing the recipient to discern not only the horizontal distance but also the vertical positioning of these assets.

For vehicle-bound recipients, the audio signals are presented through speakers within the vehicle's interior, allowing the recipient to perceive the relative location of entities without needing to divert visual attention from their primary tasks. The audio cues are spatially accurate, providing a three-dimensional soundscape that enhances the recipient's ability to understand the positions and movements of nearby entities.

The system also includes features such as predefined distance boundaries, which mute entities outside a certain boundary to reduce auditory clutter and focus the recipient's attention on the most relevant nearby entities. Additionally, the system employs context-sensitive distance boundaries based on the type of entity. For example, different boundaries might be set for ground personnel, vehicles, and aircraft, ensuring that the audio feedback is contextually appropriate and useful.

Moreover, the system supports real-time monitoring of the recipient's visual sight orientation, adjusting the Head-Related Transfer Function (HRTF) accordingly to enhance the spatial audio experience. The HRTF is tailored to the recipient's current visual focus, ensuring that the audio cues are consistent with the visual information and thus more intuitive to interpret.

This system provides significant utility in various scenarios, including military operations, aviation, and vehicular navigation, by offering a sophisticated auditory awareness tool that enhances the recipient's situational understanding. For instance, in a military context, the system allows a soldier to receive spatial cues about the positions and movements of squad members and equipment, improving coordination and reducing the risk of friendly fire. The audio signals provide real-time updates on the location and focus of nearby entities, allowing the soldier to make informed decisions rapidly.

In aviation, the system helps pilots and flight crews maintain awareness of other aircraft, ground vehicles, and obstacles, even in visually cluttered or low-visibility conditions. The audio cues can be integrated with existing avionics systems to provide seamless situational awareness, enhancing safety and operational efficiency.

For vehicular navigation, especially in complex environments such as urban areas or off-road conditions, the system aids drivers by providing spatially accurate audio cues about other vehicles, pedestrians, and obstacles. This reduces the cognitive load on the driver and allows for safer and more effective maneuvering.

The invention also includes provisions for customization and adaptability. Users can adjust the sensitivity and thresholds for audio gain, frequency modulation, and interval adjustments, tailoring the system to specific operational needs and personal preferences. This flexibility ensures that the system can be used effectively in a wide range of applications and environmental conditions.

Additionally, the system supports integration with other sensory feedback mechanisms, such as visual displays and haptic feedback, providing a multi-modal awareness tool. This integration enhances the overall user experience and ensures that the spatial cues are accessible and useful, regardless of the user's sensory preferences or limitations.

The system also features the capability to simulate real-time changes in the spatial environment, updating the auditory cues dynamically as entities move or change their focus. This real-time feedback is crucial for maintaining situational awareness in fast-paced or rapidly changing environments. The auditory cues are generated and updated based on continuous input from the sensors and data sources, ensuring that the recipient always has the most current spatial information.

The present invention provides a system for generating spatially explicit auditory cues to enhance situational awareness for vehicle-bound recipients, particularly in the context of detecting emergency vehicles. This system includes a processor configured to receive real-time location data of at least one emergency vehicle, which includes directional bearing and distance relative to the recipient's vehicle. The location data is gathered using a combination of onboard sensors, including cameras and microphones.

The system comprises computer-readable media executable on a processor to establish a communications conduit to data generated by a plurality of onboard, original equipment manufacturer (OEM) integrated vehicle cameras. These cameras provide visual data from which the system resolves the directional bearing and distance of the emergency vehicle. The audio generation module then synthesizes an emergency vehicle siren audio signal based on this data. This synthesized signal is broadcast through the vehicle's speakers corresponding to the direction of the emergency vehicle, using spatial audio techniques to simulate the precise location and distance. The audio gain of the signal is adjusted according to the distance of the emergency vehicle: closer vehicles produce louder signals, while farther vehicles produce softer signals, thereby ensuring that the driver can accurately perceive the proximity of the emergency vehicle.

In conjunction with or as an alternative to the camera data, the system employs an external directional microphone integrated into the vehicle. This microphone captures sounds from the surrounding environment and is particularly sensitive to the characteristic sirens of emergency vehicles. Upon detecting a siren, the system identifies the specific type of emergency vehicle (e.g., ambulance, fire truck, police car) or classifies it generically as an emergency vehicle. The audio generation module synthesizes a corresponding siren audio signal and broadcasts it through the vehicle's speakers, spatially oriented to match the direction from which the original siren was detected. This ensures that the driver receives clear and accurate auditory cues, enhancing their situational awareness and ability to respond promptly.

Alternatively, the system can isolate the siren audio from the ambient noise and re-broadcast the original siren within the vehicle. This approach preserves the authentic characteristics of the siren while ensuring it remains audible above any other noise inside the vehicle. The ability to distinguish and re-broadcast specific emergency vehicle sirens ensures that the driver is made aware of the presence and type of emergency vehicle, facilitating timely and appropriate actions.

Additionally, the system includes an integrated OEM microphone within the interior of the vehicle. This microphone continuously monitors the interior sound levels to determine if the emergency vehicle siren is audible to a human listener within the vehicle. If the interior microphone detects the siren at a human-perceptible level, the system does not invoke the process to synthesize simulated sirens, as the original siren is sufficiently audible. However, if the exterior microphone and/or integrated vehicle cameras detect an emergency vehicle but no siren is detectable at a human-perceivable level within the vehicle, the system invokes the synthesis process. This ensures that the driver is always made aware of nearby emergency vehicles, even in noisy environments or when the vehicle's interior is well-insulated from external sounds.

This system offers significant utility in enhancing driver awareness and safety by ensuring that emergency vehicle sirens are always perceptible, regardless of external noise conditions or interior insulation. The integration of various sensors and advanced audio processing techniques provides a comprehensive solution for detecting and responding to emergency vehicles.

BRIEF DESCRIPTION OF THE DRAWINGS

For a more full understanding of the invention, reference should be made to the following detailed description of one embodiment of the invention, taken in connection with the accompanying drawings, in which:

FIG. 16B is an isometric conceptual illustration of a flight lead recipient of generative audio cues conveying relative distance, direction and relative movement wingmen.

FIG. 16C is an isometric conceptual illustration of a flight lead recipient of generative audio cues conveying relative distance, direction and relative movement a wingman over time.

DETAILED DESCRIPTION

Figure 1:
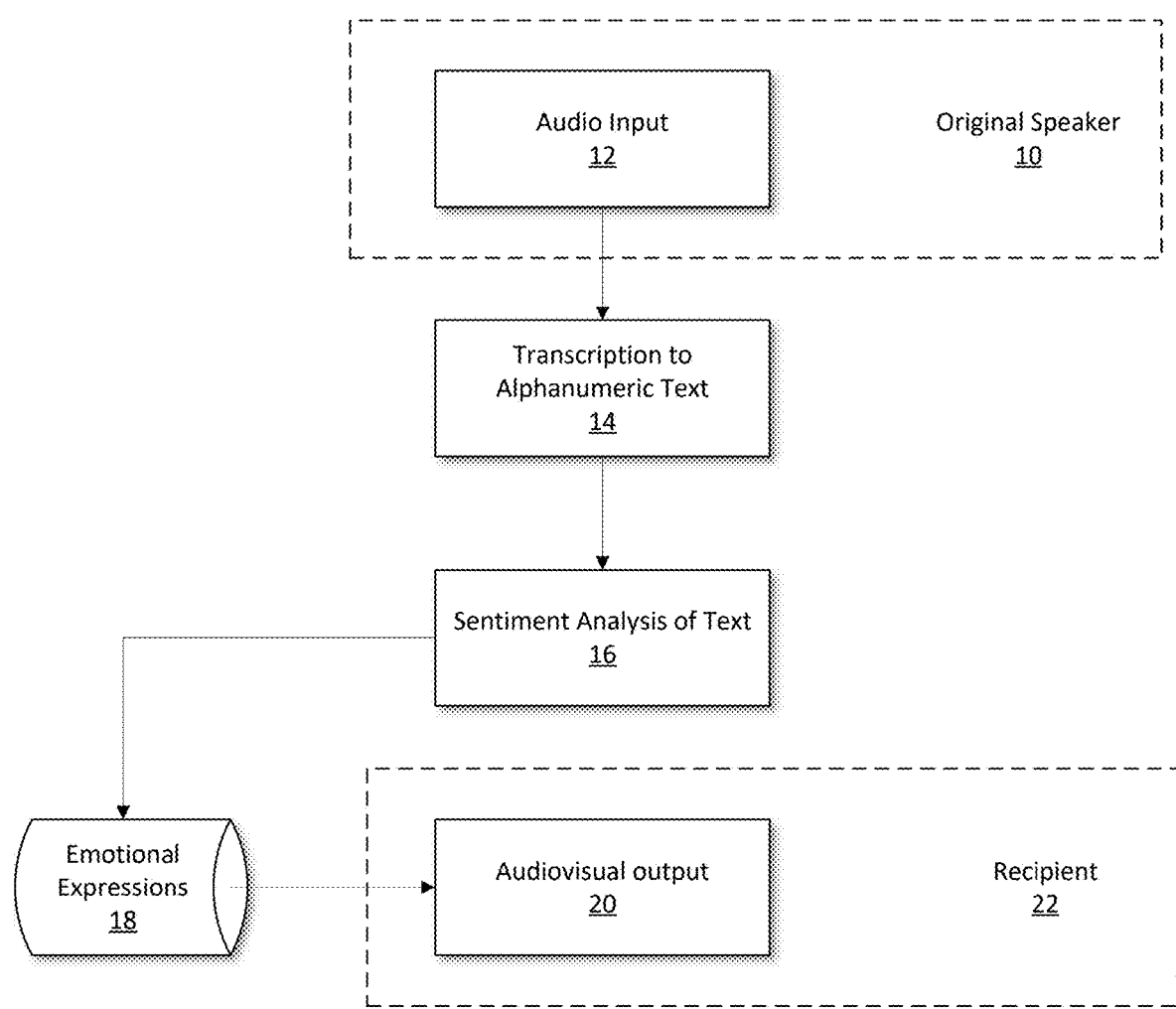
FIG. 1 is a diagrammatic view of an embodiment of the invention receiving audio and conveying an audiovisual output based on the transcribed semantics of the audio.

The subject matter of the current invention pertains to the technological facilitation of verbal communication between two parties, denoted as the emitter of the speech and the recipient, with the communicative signal transmitting between them. Communication can transpire either through direct interaction or through technological mediation. During this transmission process, assorted forms of disruptions or 'noise' may be incorporated, potentially hindering the recipient's comprehension, elongating the decoding time, complicating the process, or leading to incorrect interpretation of the message. The disruption or 'noise' in question may adopt an additive form, for instance, ambient noise located proximal to the emitter or recipient, or noise appended during the transmission or reproduction of the signal. The noise may also manifest in a multiplicative manner, represented by mechanical obstructions, physical distance, deficient articulation, linguistic accents, and auditory impairments that could diminish or distort the signal.

When the emitter and recipient are either in close physical proximity or engaging via a video-mediated interaction, multiple visual cues are available, which serve to deliver information or aid in comprehension. Such visual cues encompass movements of the emitter's oral region, specifically the lips, expressions presented on the face, direction of the gaze, rhythmic movement of the upper body correlating with respiration, manual gestures, and dynamic postural adjustments of the body. This invention incorporates systems and methods engineered for the processing of the emitter's speech and its corresponding dynamic visual features. The aim is to present the recipient with visual representations exhibiting a high signal-to-noise ratio. These visuals either reflect the likeness of the emitter or offer other visually comprehensible cues to augment comprehension. The invention is applicable for a single individual (soliloquizing), dyadic communication (interpersonal interaction), 1-to-n communication (public speaking), or n-to-1 communication (choral singing). The roles of the emitter(s) or recipient(s) can be assumed by Artificial Intelligence (AI) agents. Moreover, the invention can also be applied in situations where audio is initially recorded, such as in the case of audiobooks or music, and subsequently played back. This is particularly useful in circumstances where the speaker or singer's auditory output is incomprehensible due to the overlapping sounds produced by musical instruments or similar factors.

The invention comprises systems and methods for processing the sender's speech and dynamic visual features, creating control signals to produce relatively high signal-to-noise ratio (SNR) visual features of the sender's mouth ("high SNR control signals"), face, and body movements; transmission of encoded versions of the high SNR control signals to the receiver, along with encoded audio of the speech; reconstruction of high SNR visual representations of the sender, or visual cues associated with the sender; and presentation of the high SNR visual representations or visual cues to the receiver, along with the transmitted audio, to improve comprehension. One aspect of the invention involves methods for sensing and processing signals measured at/from the sender, producing control signals that can be subsequently used to generate high SNR corresponding visual representations or visual cues for the receiver. The manifestation for the receiver could take the form of an animated (computer graphics) mouth, an animated head, an animated upper body, or a complete virtual human. The high SNR control signals can be determined through various methods, which can be used for visual amplification, exaggeration, clarification, correction and supplementation, articulation/enunciation, translation (direct and re/paraphrased), and education (learning languages).

For example, visual features measured from the sender, e.g., via a camera, can be processed to produce control signals that represent an increased range of movement of the visual representations or visual cues reproduced for the receiver. If a user speaks softly and barely moves their lips, the high SNR control signals derived from the small lip movement can be used to create larger and clearer lip movements presented to the receiver. This approach does not require any semantic knowledge of the communication content and can be likened to a "visual automatic gain control" that amplifies visual feature movements to increase the visual SNR for the receiver. Similarly, audio features measured from the sender, e.g., signals obtained via a microphone, analog-to-digital processing, and signal processing, can be processed to produce control signals that represent clear visual (high SNR) representations or visemes of the detected speech sounds, such as phonemes. This approach also bypasses the need for speech understanding, relying instead on the detection of specific audio features.

Words detected from the sender's audio can be mapped to sets of control signals that create clear visual dynamics, including articulate movements of rendered lips, facial features, and breathing. For instance, recognizing the word "moon" from softly spoken audio can generate control signals for distinct "moon" lip movements and facial expressions at the receiver. More advanced methods can detect phrases or sentences, use contextual understanding to correct errors (e.g., replacing "red" with "bread" in a sentence based on context), and generate corresponding visual representations. This approach can involve "audio-visual transcription" and error detection to improve the accuracy and clarity of communication.

The system can also translate detected words, phrases, or sentences into another language and map these to control signals for visual representation in the target language. For example, translating "Good morning" into "Guten Morgen" and generating corresponding lip movements and facial expressions for the receiver. This functionality extends to pre-recorded media, such as movies or podcasts, where translated visual cues can replace the original ones to match the target language.

Additionally, the invention can create language learning tools by producing dynamic visual representations of speech in a target language, aiding learners in understanding both the spoken phrases and associated facial expressions. Generative AI can further refine these visual cues, transforming terse statements into more complete and polite ones or replacing expletives with harmless alternatives in real-time, enhancing the usefulness for live TV shows and other applications.

The invention's applications include improving online audio communication, adding visuals to voicemail, assisting individuals who are deaf or hard of hearing, translating languages, enhancing language learning, and dubbing movies with synchronized lip movements for translated dialogue. The invention can be integrated into various platforms and devices, such as mobile phones, movie production systems, live video platforms, and educational tools, to provide enhanced communication through high SNR visual signals. By combining audio and high SNR visual signals, the invention significantly improves comprehension, especially in noisy environments, making it a valuable tool for diverse communication needs.

Embodiments of the present invention pertains to advanced systems and methodologies for facilitating verbal communication between two or more parties, be it in person or through technological interfaces. This communication process involves a party transmitting the information (hereafter referred to as the 'sender') and a party receiving it (the 'receiver'). It is known that during this exchange, a myriad of noise types may infiltrate the communication, potentially affecting the receiver's comprehension speed, complexity, or accuracy.

This noise can take an additive form, such as ambient noise near the sender or the receiver, or noise appended to the signal during transmission. Alternatively, it can assume a multiplicative form, originating from mechanical barriers, distance, poor articulation, linguistic accents, and hearing disorders, which can attenuate or distort the signal.

Visual cues, when the sender and receiver are either in physical proximity or communicating through video, can supply critical information or support comprehension. These cues encompass the sender's mouth movements, facial expressions, upper body movements associated with breathing, gestures, and dynamic body postures. The invention incorporates systems and methods engineered for processing the sender's speech and corresponding dynamic visual features. The goal is to present the receiver with visual representations that exhibit a high signal-to-noise ratio (SNR). These representations can portray the sender or provide other visually discernible cues to enhance comprehension.

The invention's utility spans from single-person use (monologue), two-person interaction (dialogue), one-to-many communication (public speaking), to many-to-one communication (choral singing). Artificial Intelligence (AI) agents can assume the roles of the sender(s) or receiver(s). The invention also finds application in pre-recorded audio scenarios like audiobooks or music, where audio is initially recorded and then played back. This is particularly useful when the speaker or singer's auditory output is obscured due to the overlapping sounds produced by musical instruments or similar factors.

One significant aspect of the invention encompasses methodologies for detecting and processing signals originating from the sender. These signals are then transformed into control signals that can be used subsequently to produce high SNR visual representations or cues for the receiver. The receiver's perception may involve a computer graphics animation of the sender's mouth, head, upper body, or an entire virtual human representation.

These high SNR control signals can be determined through various methods, aiming to visually amplify, exaggerate, clarify, correct, supplement, articulate/enunciate, translate (both direct and re-paraphrased), and educate (for language learning). For instance, visual features measured from the sender can be processed to produce control signals representing an increased range of movement for the reproduced visual cues. Audio features, such as signals obtained through a microphone, can also be processed to produce control signals yielding clear visual (high SNR) representations of detected speech sounds.

Moreover, words detected from the sender's audio can be mapped to control signals, creating clear visual (high SNR) dynamics of the words. This includes articulate movements of rendered lips, facial features, and simulated breathing patterns. In another instance, audio can be translated into another language for the receiver. The translated words are then mapped to sets of control signals to produce clear visual (high SNR) dynamic representations in the target language.

Additionally, this methodology can be used to create visually appropriate language learning tools by producing dynamic visual high SNR representations corresponding to the target language words, phrases, or sentences.

Speech Emotion Recognition (SER) is a technology that makes it possible to infer the sentiment or emotional state from non-semantic waveform analysis of audio. This process doesn't involve understanding the meaning of the spoken words (semantics) but rather focuses on prosodic features of the speech such as pitch, intensity, rhythm, speed, and tone of voice. These aspects of speech can carry significant information about the speaker's emotional state. For instance, when a person is excited or happy, they often speak more quickly, with a higher pitch and greater variation in intonation. Conversely, a person who is sad or bored might speak more slowly, with a lower pitch and less variation in intonation. Anger might be characterized by a louder, harsher, and faster speech. There are various techniques in the field of speech processing, machine learning, and AI that can be applied to analyze these features from audio waveforms and predict the emotional state of the speaker. These techniques have been used to build emotion recognition systems, which have applications in areas like call centers, interactive voice response systems, and mental health assessment. An embodiment of the present invention processes speaker audio with SER to derive the emotional sentiment of the speaker. The recipient of the speech may be otherwise unable to resolve the speaker sentiment due to technical, mental or physical accessibility limitations.

Accordingly, from an audio stream or file, SER-derived sentiment is sent to the recipient in the form of visual indicium. This could be an anthropomorphic avatar generated to convey body language and facial expressions consistent with the sentiment that would be less accessible or intelligible to certain listeners. Furthermore, once the sentiment is derived it may be conveyed in different modalities. For example, for captioning the audio to a deaf individual, the avatar and even captions that are annotated with the sentiment (e.g., [frightenedly]"Lock the door now!").

To provide a detailed implementation example, consider an embodiment where an MP4 video file containing speech is processed to analyze and convey the emotional content. The process begins with the extraction of the audio track from the video file. This can be achieved using tools like FFmpeg, which separates the audio from the video stream and saves it in a standard format such as WAV. The extracted audio is then subjected to a series of preprocessing steps to prepare it for emotion analysis.

The preprocessing involves the extraction of prosodic features such as pitch, intensity, rhythm, speed, and tone of voice. These features are critical for SER as they encapsulate the non-semantic elements of speech that convey emotional information. Tools like OpenSMILE (audEERING) can be used for this purpose, providing a detailed analysis of the audio waveform and outputting the features in a structured format. This feature extraction process is essential for capturing the nuances of speech that reflect different emotional states.

Once the prosodic features are extracted, they are fed into a machine learning model designed to classify emotions. This model can be a Convolutional Neural Network (CNN) or a Recurrent Neural Network (RNN), both of which are well-suited for analyzing sequential data like audio waveforms. These models are trained on large datasets of labeled audio samples, allowing them to learn the correlations between specific prosodic patterns and emotional states. Libraries like TensorFlow or PyTorch can be used to implement these models, leveraging their extensive tools for building and training neural networks.

The trained model processes the extracted features and outputs a prediction of the speaker's emotional state. This prediction is then translated into a corresponding label, such as happy, sad, angry, etc. The emotional label is used to query a database of pre-configured emotional expressions. This database contains a variety of anthropomorphic avatars and animations that visually represent different emotions. Each avatar is designed to exhibit facial expressions and body language that align with the detected emotion, providing a clear and intuitive visual representation.

The next step involves generating an audiovisual output that synchronizes the emotional avatar with the original speech. This is achieved by creating an animation sequence where the avatar's facial expressions and body movements correspond to the detected emotion. Tools like BLENDER or UNITY3D can be employed to create and animate the avatars, ensuring that they accurately reflect the emotional content of the speech. The synchronized animation is then combined with the original audio to produce a cohesive audiovisual output.

The final output can be delivered to various devices, including computer screens, AR/VR headsets, or mobile devices. This flexibility ensures that the emotional content is accessible to users regardless of their platform. For individuals with hearing impairments, additional features like captioning can be implemented. The captions are annotated with emotional context (e.g., [angrily]"Lock the door now!"), providing a textual representation of the speaker's emotion.

Furthermore, the system can handle multi-modality outputs, enhancing the accessibility and comprehension of the conveyed emotion. For example, in an AR/VR environment, the emotional avatars can be rendered in 3D, providing an immersive experience that closely mimics face-to-face interactions. The avatars can also be equipped with dynamic expressions that change in real-time based on the speaker's emotional state, ensuring continuous and accurate emotional feedback.

In another embodiment, the system can integrate additional sensory inputs such as video. By analyzing the speaker's facial expressions and body language in conjunction with the audio, the system can provide a more comprehensive emotional analysis. This multimodal approach leverages computer vision techniques to detect visual cues that complement the prosodic features of the speech. For instance, a speaker's smile or frown can enhance the accuracy of the emotion recognition, leading to more nuanced and reliable outputs.

The visual analysis involves the use of deep learning models like Convolutional Neural Networks (CNNs) to detect and interpret facial expressions. These models are trained on large datasets of labeled facial images, enabling them to recognize subtle changes in facial muscles that correspond to different emotions. The detected visual cues are combined with the audio-based prosodic features to generate a unified emotional profile. This profile is then used to animate the avatar, ensuring that both the audio and visual aspects of the speaker's emotion are accurately represented. Emotion-Aware Anthropomorphic Audiovisual Communication.

In one embodiment of the invention, a speaker's speech is taken as an input. The system analyzes this audio data using sophisticated algorithms, extracting the inherent semantic meaning embedded in the speech. Following this extraction, the system employs emotion recognition strategies to ascertain one or more emotions present within the conveyed message. Emotion analysis from alphanumeric text is often accomplished through techniques from the field of Natural Language Processing (NLP), a branch of artificial intelligence that deals with the interaction between computers and humans using natural language. A popular method is sentiment analysis, which identifies and extracts subjective information from source materials. Sentiment analysis uses NLP, text analysis, and computational linguistics to identify and extract subjective information from source materials. It generally classifies the polarity of a given text at the document, sentence, or feature/aspect level—whether the expressed opinion in a document, a sentence or an entity feature/aspect is positive, negative, or neutral, and to what degree.

Machine learning techniques, such as Naive Bayes, Support Vector Machines, or deep learning models like Long Short-Term Memory (LSTM) or Transformers, can be trained on labeled datasets (text annotated with emotional states) to learn the correlation between certain phrases, words, or types of syntax, and the associated emotion. For instance, the phrase "I love this!" would likely be associated with a positive emotion, while "I hate this!" would be associated with a negative emotion. These models can then use what they've learned to analyze new, unlabeled text and predict the likely emotional state of the author. Another technique often used is lexicon-based methods, where certain words are pre-assigned scores indicating their emotional weight. For example, 'happy' might be assigned a positive score and 'sad' a negative one. The overall emotion of the text is then determined by some function of the individual scores.

The system then generates an anthropomorphic audiovisual representation, which it presents to the intended message recipient. This anthropomorphic manifestation exhibits human-like characteristics, integrating facial expressions and body language to visually express the original content. Additionally, the system integrates the emotions derived from the semantic content, producing a layered communication output that effectively communicates the speaker's entire intended message.

To illustrate the process in more technical detail, consider an example where the system processes a WAV audio file. Initially, the audio file is converted into text using speech-to-text algorithms. Tools such as Google Cloud Speech-to-Text or IBM Watson Speech to Text can be used to perform this conversion, leveraging their robust NLP capabilities to handle diverse accents and dialects.

Once the speech is transcribed into text, the system employs sentiment analysis to interpret the emotional context of the spoken words. Sentiment analysis can be implemented using NLP libraries like NLTK (Natural Language Toolkit) or spaCy. These libraries provide pre-trained models capable of analyzing text at various levels—document, sentence, or phrase—assigning sentiment scores to each segment. The analysis typically involves tokenization (breaking down the text into individual words or phrases), followed by the application of sentiment scoring algorithms. These algorithms may use a combination of machine learning models and lexicon-based approaches to determine the emotional polarity of the text.

For example, if the transcribed text includes the sentence "I am extremely happy with the results," the sentiment analysis algorithm would identify key positive words like "happy" and "extremely," assigning a high positive score to the sentence. Conversely, a sentence like "I am deeply disappointed with the service" would be assigned a high negative score due to the presence of words like "disappointed" and "deeply."

The system's machine learning component, which may include models such as Naive Bayes, Support Vector Machines (SVM), or more advanced deep learning models like LSTMs and Transformers, is trained on large datasets annotated with emotional states. These datasets help the models learn the intricate patterns and correlations between different words, phrases, and emotional contexts. For instance, a Transformer model, which excels in handling sequential data, can be fine-tuned on a corpus of emotional texts, enabling it to predict the emotional state of new, unseen text accurately.

After the sentiment analysis, the system integrates the identified emotions into an anthropomorphic audiovisual representation. This involves generating an avatar that exhibits human-like facial expressions and body language corresponding to the detected emotions. The creation of such avatars can be accomplished using 3D modeling software, which allow for the detailed design and animation of anthropomorphic characters.

The avatars are programmed to reflect various emotional states through their expressions and movements. For instance, a happy emotion might be represented by an avatar with a smiling face, bright eyes, and energetic gestures. In contrast, a sad emotion could be depicted with a downturned mouth, drooping eyes, and sluggish movements. These animations are synchronized with the original speech, ensuring that the visual representation aligns perfectly with the audio content.

Moreover, the system can adapt the emotional representation based on cultural context and user preferences. For instance, in some cultures, a nod might signify agreement, while in others, it could mean something entirely different. The system can be configured to account for these cultural variations, making the emotional communication more intuitive and effective for diverse audiences.

In addition to visual expressions, the system can also enhance the audio output to reflect the detected emotions. This can involve modifying the tone, pitch, and speed of the synthesized speech to match the emotional state. For example, an angry emotion might be conveyed through a harsher, louder voice, while a calm emotion might be reflected in a softer, more soothing tone.

The final output, which includes the synchronized audiovisual representation, is then transmitted to the recipient's device. This can be done through various platforms, including computer screens, AR/VR headsets, or mobile devices, providing a flexible and accessible means of communication. The system ensures that the recipient receives a holistic and enriched communication experience, combining both the semantic content and the emotional nuances of the original speech.

Multilingual Emotional Communication.

In another embodiment of the invention, the input speech is delivered in a primary language. Before commencing translation, the system identifies one or more emotions present in the speech. Once the emotional content is isolated, the speech is translated into a secondary language. In this instance, the anthropomorphic audiovisual representation audibly delivers the speech in the secondary language. It retains the emotional resonance identified from the original language, ensuring that the recipient perceives the full emotional and contextual scope of the message.

To illustrate this embodiment in greater technical detail, consider a scenario where a speaker delivers a speech in English, which needs to be translated into Spanish while retaining the emotional content. The process begins by capturing the speech input, typically in an audio format such as WAV or MP3. The system then processes this audio input using speech-to-text algorithms, converting the spoken words into textual data. This initial transcription can be performed using advanced NLP tools like Google Cloud Speech-to-Text or IBM Watson Speech to Text, which provide high accuracy in converting spoken language into text.

Once the speech is transcribed, the system performs an emotion recognition analysis on the textual data. This step involves the use of sentiment analysis techniques to determine the emotional state conveyed by the speaker. NLP libraries like NLTK or spaCy can be employed for this purpose, leveraging their pre-trained sentiment analysis models to classify the text based on emotional polarity—positive, negative, or neutral—and specific emotions such as joy, sadness, anger, or fear. For example, the phrase "I am thrilled with the outcome!" would be identified as expressing a positive emotion, specifically joy.

In parallel, prosodic features of the audio, such as pitch, intensity, rhythm, and tone, are analyzed to reinforce the emotional detection from the text. Tools like OpenSMILE can be used to extract these features, providing a comprehensive understanding of the emotional content. This dual-layered approach-combining textual sentiment analysis with audio prosody-ensures a more accurate and nuanced identification of the speaker's emotions.

After identifying the emotional content, the system proceeds with the translation of the transcribed text into the target language, in this case, Spanish. This translation process utilizes sophisticated machine translation models such as Google Translate API, DeepL, or Microsoft Translator. These models are trained on vast multilingual datasets, enabling them to handle complex linguistic structures and idiomatic expressions with high fidelity. The translation process ensures that the semantic meaning of the original speech is accurately conveyed in the target language.

The next step involves generating an anthropomorphic audiovisual representation that delivers the translated speech while preserving the original emotional resonance. This representation is created using 3D modeling and animation software, which allows for the detailed design and animation of avatars. The avatars are programmed to exhibit human-like facial expressions and body language corresponding to the detected emotions. For instance, if the original speech conveyed excitement, the avatar would be animated with a smiling face, wide eyes, and energetic gestures.

To synchronize the translated speech with the avatar's expressions, the system employs text-to-speech (TTS) technology. TTS engines like Google Cloud Text-to-Speech or Amazon Polly are used to generate synthetic speech in the target language. These engines can be customized to adjust the tone, pitch, and speed of the synthesized voice to match the emotional content identified earlier. For example, a joyful sentence would be spoken in a lively and upbeat tone, whereas a somber sentence would be delivered in a slower and more subdued manner.

Additionally, the system integrates the prosodic features extracted from the original audio into the synthesized speech. This integration ensures that the emotional nuances-such as variations in pitch and intensity—are retained in the translated output. By maintaining these prosodic characteristics, the system preserves the speaker's emotional intent, providing a more authentic and emotionally resonant communication experience.

The final audiovisual output, which includes the animated avatar and the synchronized translated speech, is then transmitted to the recipient's device. This output can be delivered through various platforms, including computer screens, AR/VR headsets, or mobile devices, ensuring accessibility across different user interfaces. The recipient perceives not only the translated speech but also the emotional context, as conveyed by the avatar's expressions and the nuanced delivery of the synthesized voice.

In more advanced applications, the system can adapt the emotional representation to different cultural contexts. Emotional expressions and body language can vary significantly across cultures, and the system can be configured to account for these variations. For instance, a gesture that signifies agreement in one culture might have a different meaning in another. By incorporating cultural norms and preferences into the avatar's animations, the system ensures that the emotional communication is appropriate and effective for diverse audiences.

Moreover, the system can handle multiple languages and dialects, making it a versatile tool for global communication. By training the translation and emotion recognition models on multilingual datasets that include various dialects and regional expressions, the system can accurately process and convey emotional content across different linguistic and cultural contexts.

Emotion-Driven Content Alteration from Visual Inputs

In a different embodiment, the invention takes both video and audio from the speaker as inputs. The system processes the video to scrutinize the speaker's facial expressions and body language, identifying one or more emotions visually conveyed. Emotion recognition from imagery, such as facial expressions or body posture, typically relies on computer vision techniques, a field of artificial intelligence that enables computers to interpret and understand the visual world.

Facial emotion recognition is one of the most common and effective ways to infer someone's emotional state from imagery. Facial expressions are often closely tied to an individual's emotional state, making them a rich source of data for emotion recognition. A common approach involves using Convolutional Neural Networks (CNNs), a type of deep learning model particularly effective at image analysis. The process starts with face detection, usually using techniques such as Haar cascades or more sophisticated methods like the Multi-task Cascaded Convolutional Networks (MTCNN). Once the face is isolated from the rest of the image, the CNN model identifies key features on the face related to different emotions (e.g., the corners of the mouth turning up for happiness, eyebrows drawing together for anger, etc.). These models are trained on large datasets of facial images labeled with the correct emotion. Once trained, they can predict the emotion expressed by a new, unlabeled facial image.

In addition to facial cues, the system may analyze body posture to infer emotional state. Pose estimation involves detecting human figures in images or videos and identifying the positions of key body joints (e.g., elbows, knees, wrists). Deep learning models, like OpenPose or PoseNet, are commonly used for this task. These models can estimate the pose of a person in real-time, even if parts of the person's body are occluded or the lighting conditions are not ideal. Once the pose is estimated, emotion inference can be made based on the body language. For instance, an open posture with arms spread out might indicate joy or excitement, whereas a slouched posture might suggest sadness or disinterest.

To enhance the analysis, the system further incorporates spatial pose information, particularly focusing on head orientation relative to the listener. The head orientation data provides critical contextual information about the speaker's engagement and focus, which is vital for interpreting social and emotional cues accurately. The system utilizes advanced head pose estimation techniques that detect and track the orientation of the speaker's head in three-dimensional space.

Head pose estimation typically involves detecting facial landmarks (e.g., eyes, nose, mouth) and using geometric transformations to determine the orientation angles (yaw, pitch, roll). By leveraging machine learning models like Dlib or specialized deep learning frameworks, the system can accurately estimate head poses even in dynamic and cluttered environments.

Once the head orientation is determined, the system integrates this spatial pose data with the body posture and facial cues to provide a comprehensive analysis of the speaker's emotional state. For instance, a speaker with a tilted head and direct gaze might indicate attentiveness or curiosity, while an averted gaze and head turned away might suggest disinterest or discomfort. This multidimensional analysis allows the system to infer more nuanced emotional states and social interactions.

The system can then use this integrated spatial pose information to generate more accurate and expressive anthropomorphic avatars. By incorporating head orientation and body posture data, the avatars can exhibit more lifelike and contextually appropriate behaviors, enhancing the realism and effectiveness of the communication. For example, an avatar can simulate looking towards the listener during conversation or exhibit responsive gestures that reflect the detected head and body orientations.

In addition to generating anthropomorphic visual representations, the system can create "Auvatars"—audio-based avatars designed to enhance accessibility for visually impaired users. Auvatars represent individuals through unique audio motifs or sets of tones that convey their presence, movements, and emotional states in a non-visual format.

Auvatars use a personalized tune, melody, or motif for each individual, which plays quietly in the background to indicate their spatial location. The audio motif changes dynamically to reflect variations in body posture and facial expressions. For example, an increase in volume or the introduction of discordance can indicate anger or confusion, while harmonious tones can signify happiness. This auditory feedback provides real-time cues about the presence and emotional state of other participants. Auvatars activate when there is a significant change in the person's posture or expression, alerting the listener to new interactions or movements. This feature is particularly beneficial in virtual meetings, where the sudden appearance of sound indicates a person joining or leaving the session.

Users can customize their Auvatars similarly to visual avatars, adding personal touches that reflect their identity and mood. This customization can include basic motifs that represent the person consistently, with additional modifications for specific moods or themes, akin to changing clothing or accessories in visual avatars.

Concurrently with detection visual emotion cues, an initial transcript of the speaker's audio is generated. This transcript is forwarded to a generative language model, which produces a modified transcript. This new transcript incorporates the emotions identified through the video analysis into the original audio content, yielding an emotionally consistent script. Subsequently, the system generates an anthropomorphic visual representation based on the revised transcript and communicates this to the recipient. The recipient's received visual representation harmonizes the semantics of the audio output with the anthropomorphic expressions, ensuring a comprehensive multi-sensory comprehension of the message conveyed.

In all instances, various tools such as sound and speech recognition, lookup tables, machine learning, other forms of AI, including generative AI, can be used for processing, conversion, and translation. The visual representations can be learned or trained via various means, for instance, using video recordings of diverse volunteers speaking a controlled set of words, phrases, and sentences.

Another embodiment of the invention includes integration of an omnidirectional high-sensitivity microphone, advanced signal processing, and contextual information delivery mechanisms. At its core, the system leverages a high-precision, omnidirectional microphone to collect ambient audio data from the user's environment. Advanced digital signal processing and machine learning algorithms are employed to isolate and classify sounds of interest, ranging from low-frequency traffic noise to high-frequency emergency sirens.

In conjunction with environmental sound detection, speech recognition capabilities are integrated, allowing the system to interpret conversational content and sentiment. By applying emotion analysis techniques, the system can provide an additional layer of context about potential verbal altercations. Additionally, the invention incorporates language translation services, which ensures the system's functionality is maintained across different linguistic contexts.

In another embodiment, video input is utilized to cross-verify audio-derived information. This additional layer of sensory input enables the system to leverage image processing algorithms for accurately counting the number of individuals in a conversation, detecting potential physical threats, or understanding complex environments. The processed information is conveyed to the user via preferred methods, including audio descriptions, tactile feedback through a Braille interface, or spatially contextualized augmented reality audio cues. Although the system is particularly beneficial for visually impaired individuals, it also finds application among other user groups requiring enhanced situational awareness. This includes first responders and soldiers, where real-time, detailed environmental understanding can significantly impact performance and safety. Therefore, the technology serves as an advanced auditory situational awareness tool, synthesizing multimodal data inputs to create an enriched perception of the user's environment.

Use Cases. The technology described in the present claims offers several potential applications and benefits across different fields, bridging the gap between verbal and non-verbal communication through the utilization of an emotion-detection mechanism.

Individuals on the Autism Spectrum. Individuals on the autism spectrum often have difficulty interpreting emotions and social cues. This invention provides a novel and potentially transformative tool for improving their understanding and interpretation of these cues. By processing speech and visual cues, and then converting these into high signal-to-noise ratio visual representations that effectively communicate the original message's emotional nuances, this system could be a valuable tool for enhancing their ability to understand and respond to both verbal and non-verbal communication cues. This could potentially lead to significant improvements in their social interactions, emotional comprehension, and overall communication skills.

Customer Service. In customer service scenarios, this technology could be used to manage and improve interactions with customers. Aggressive or conflictual speech could be filtered, modified, or replaced with more diplomatic communications and visual representations. This could help in diffusing tense situations, leading to more positive outcomes and improved customer satisfaction. Furthermore, customer service representative may be spared the emotional exhaustion of continuous conflict communications. This system could convey the required technical details of the customer issue and filter out unnecessary, frustrative language. Furthermore, the capacity of the system to understand and interpret emotions also makes it possible to tailor responses more accurately to the customer's emotional state, improving the customer service experience.

Language Translation. The system's ability to translate speech from one language to another, while also detecting and conveying the embedded emotional context, offers considerable potential for improving intercultural communication. In instances where a mistranslation might otherwise be received as offensive, the inclusion of the speaker's positive or polite body language could allow the recipient to understand that the communication was not made with malevolent intent. This could prevent misunderstandings, reduce conflicts, and improve the effectiveness of communication across different languages and cultures.

Teletherapy and Counseling. In teletherapy and counseling scenarios, the system's emotion-detection capabilities could enable therapists to better interpret their clients' emotional states, even when physical distance and technological interfaces might otherwise obscure these cues. By creating an anthropomorphic audiovisual representation that conveys not only the content of the client's speech but also the embedded emotional context, therapists could gain a deeper understanding of their clients' emotional states, which could, in turn, inform their therapeutic interventions.

Distance Learning. In distance learning scenarios, the system could be used to enhance the communication of teachers with their students. By detecting and conveying the emotional content of the teacher's speech, students could better understand the nuances of the instruction. This could lead to improved student engagement and learning outcomes.

Artificial Intelligence Communication. The technology could also be used to improve the communication capabilities of AI systems. By employing the system's emotion-detection and conversion mechanisms, AI systems could present their outputs in a more human-like manner, incorporating both verbal and non-verbal cues. This could make interactions with AI systems more engaging, intuitive, and effective, leading to enhanced user experiences.

Public Speaking and Performance. For public speakers, performers, and other individuals who need to communicate effectively with large audiences, the system could be used to analyze and improve their emotional communication. By providing feedback on the emotional content of their speech and visual cues, the system could help these individuals to enhance their performances and connect more effectively with their audiences.

These are just a few of the potential use cases for this innovative technology. With its ability to interpret and convey emotional context, the system offers a valuable tool for enhancing communication in a variety of scenarios. It demonstrates how cutting-edge technological developments can be leveraged to address complex and important challenges in the field of communication.

While the aforementioned examples demonstrate the creation and use of high SNR control signals for various applications, a person skilled in the art would understand that various permutations, variations, extensions, combinations, or other transformations of these methods and uses are possible.

FIG. 1 depicts an embodiment of the invention that is designed to receive audio input 12 from an original speaker 10, which is then transcribed and analyzed for sentiment before an audiovisual output 20 is generated and transmitted to recipient 22. The process begins with the receipt of audio input 12 from original speaker 10. This audio input, in the form of spoken language, is captured using suitable hardware such as a microphone or a network-based input system. It is then subjected to transcription 14, which converts the speech into an alphanumeric text format. This transcription process is likely to involve speech-to-text algorithms, which may be based on deep learning methodologies for optimal performance.

Following the transcription process, the text is then subjected to a sentiment analysis 16. This sentiment analysis employs natural language processing (NLP) and machine learning techniques to determine the underlying sentiment of the text. These techniques are typically based on trained models, which are capable of identifying various linguistic indicators of sentiment, such as word choice, sentence structure, and use of emotive language. Upon identification of the sentiment, the system queries a store of emotional expressions 18, which contains a variety of pre-set emotional responses. Each response in this store is associated with a specific sentiment, allowing the system to select the most appropriate response based on the sentiment identified in the analysis. This response is then used to generate an audiovisual output 20 that represents the sentiment in an anthropomorphic form. The audiovisual output 20 is then transmitted to the recipient 22. The recipient could be a human user or an automated system that can interpret and react to the output. The audiovisual output may be presented in various forms depending on the preferences of the recipient, which could include text, images, animations, or synthetic speech.

Figure 2:
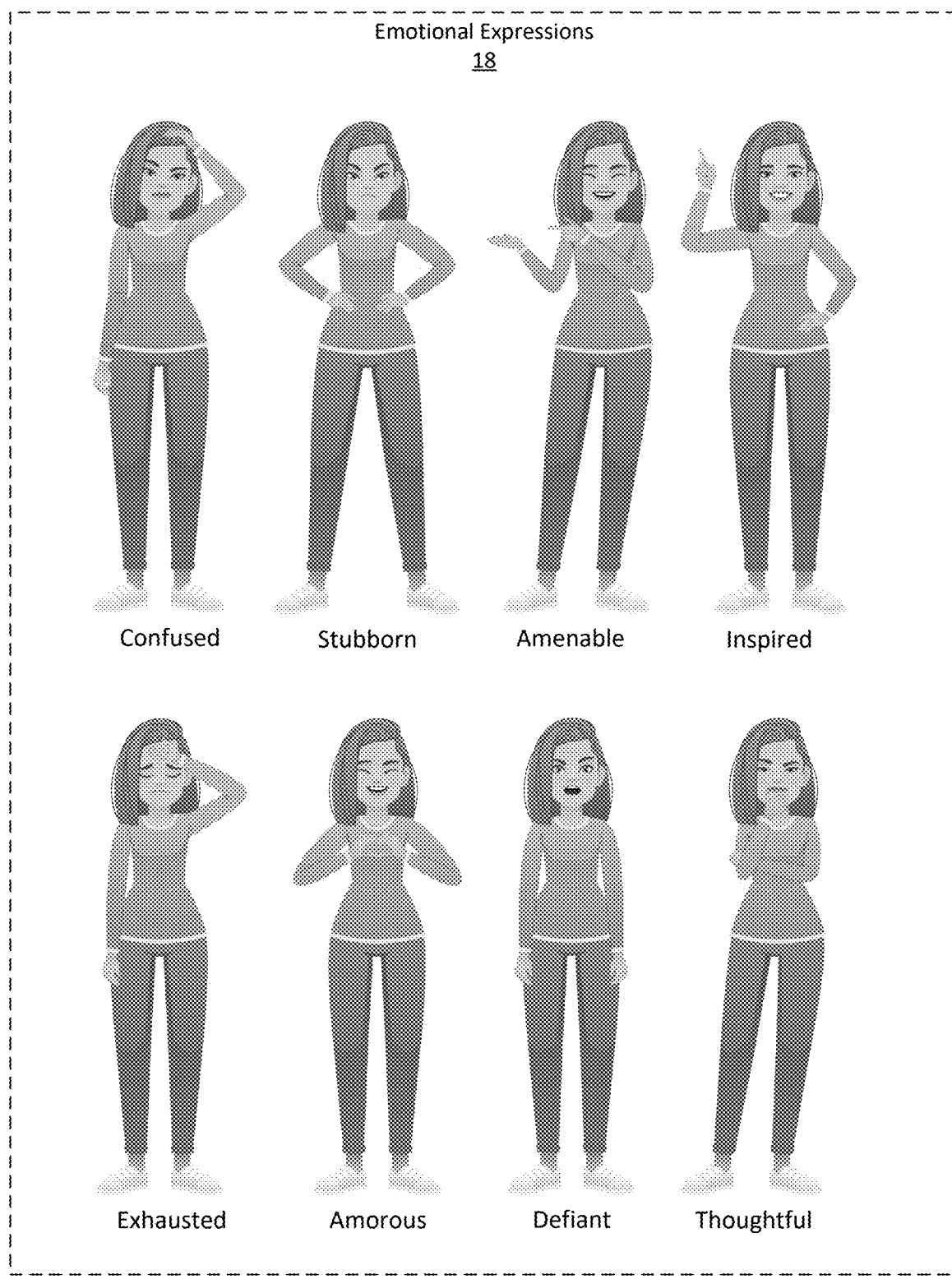
FIG. 2 is a diagrammatic view of a plurality of anthropomorphic representations of different emotional sentiments used in embodiments of the invention for visual output to a recipient.

Turning to FIG. 2, a list of anthropomorphic representations associated with a plurality of emotional sentiments is shown. These representations are used in various embodiments of the invention to visually communicate the emotional content of the original speech to the recipient. The sentiments illustrated include confused, stubborn, amendable, inspired, exhausted, amorous, defiant, and thoughtful. Each sentiment is associated with a distinct visual representation, allowing the recipient to understand the speaker's emotional state at a glance. The anthropomorphic representations can be delivered as static images, animations, or even fully-rendered 3D avatars, each embodying the respective emotional sentiment in a visually distinct and expressive manner.

Figure 3:
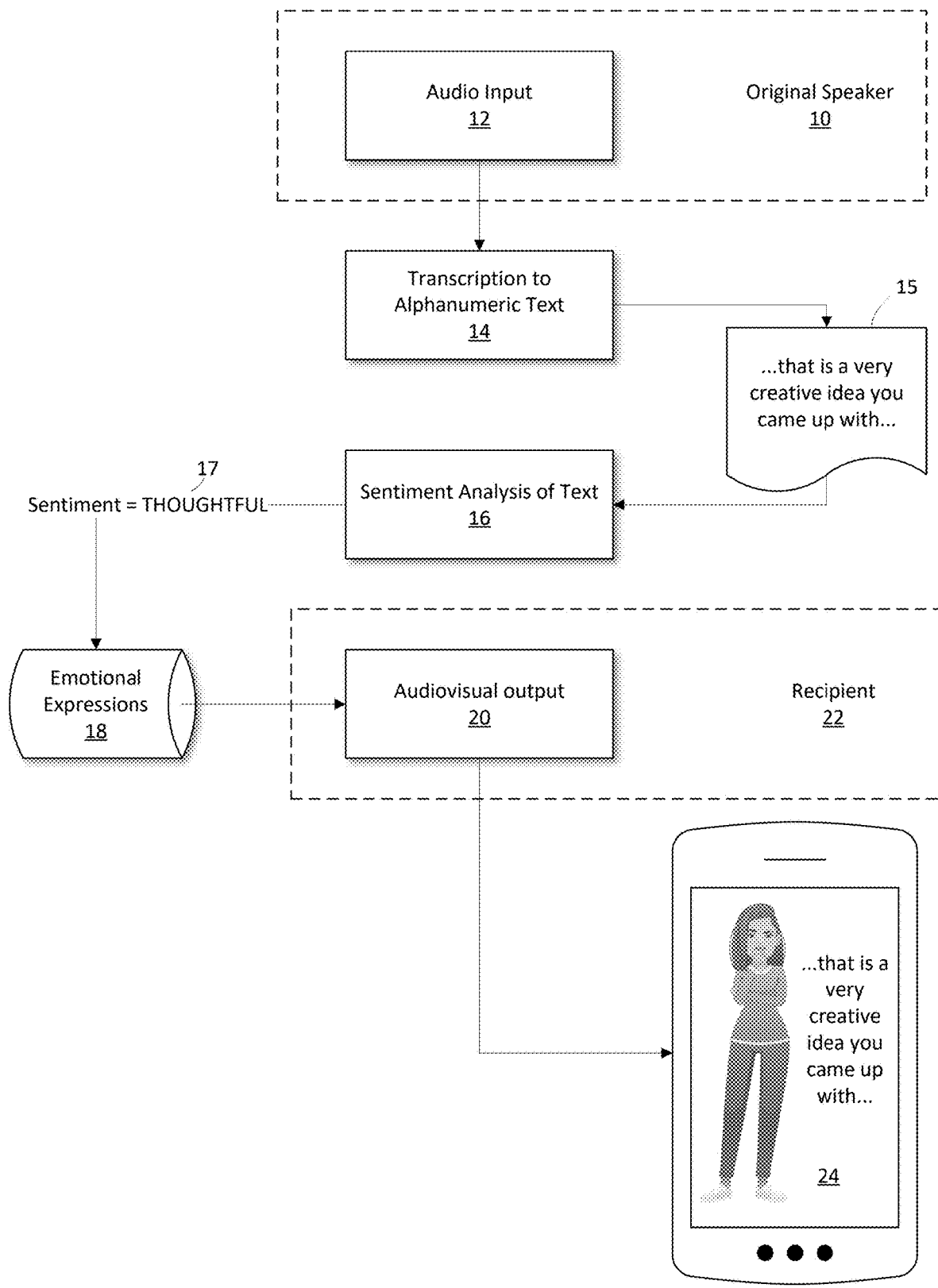
FIG. 3 is a diagrammatic view of an embodiment of the invention transcribing audio of a speaker to derive a semantic sentiment of thoughtfulness and visually conveying the sentiment to a recipient.

FIG. 3 illustrates an embodiment of the invention that is tasked with transcribing the audio input of a speaker, deriving a semantic sentiment from the transcribed content, and visually conveying this sentiment to a recipient. In this specific scenario, audio input 12 by the original speaker is transcribed into alphanumeric text 14. The content 15 derived from the transcription is an example phrase: " . . . that is a very creative idea you came up with . . . " This sentence is then analyzed by sentiment analysis 16.

Sentiment analysis 16, a procedure utilizing natural language processing (NLP) algorithms, applies a series of heuristics or machine learning-based models to determine the sentiment expressed in the content. In this instance, the sentiment analysis returns result 17, identifying the sentiment as "thoughtful." Upon the generation of sentiment result 17, the system queries a database or store of emotional expressions 18. This store contains preconfigured responses linked with specific sentiments. The system then generates an audiovisual output 20 that embodies the identified sentiment, "thoughtful." The audiovisual output 20 is displayed on display 24. It features an anthropomorphic visual representation of the sentiment "thoughtful," giving the recipient a visually intuitive and immediate understanding of the sentiment expressed by the original speaker. This visual representation is displayed concurrently with the relative portion of content 15, allowing the recipient to correlate the sentiment with the context in which it was expressed.

Figure 4:
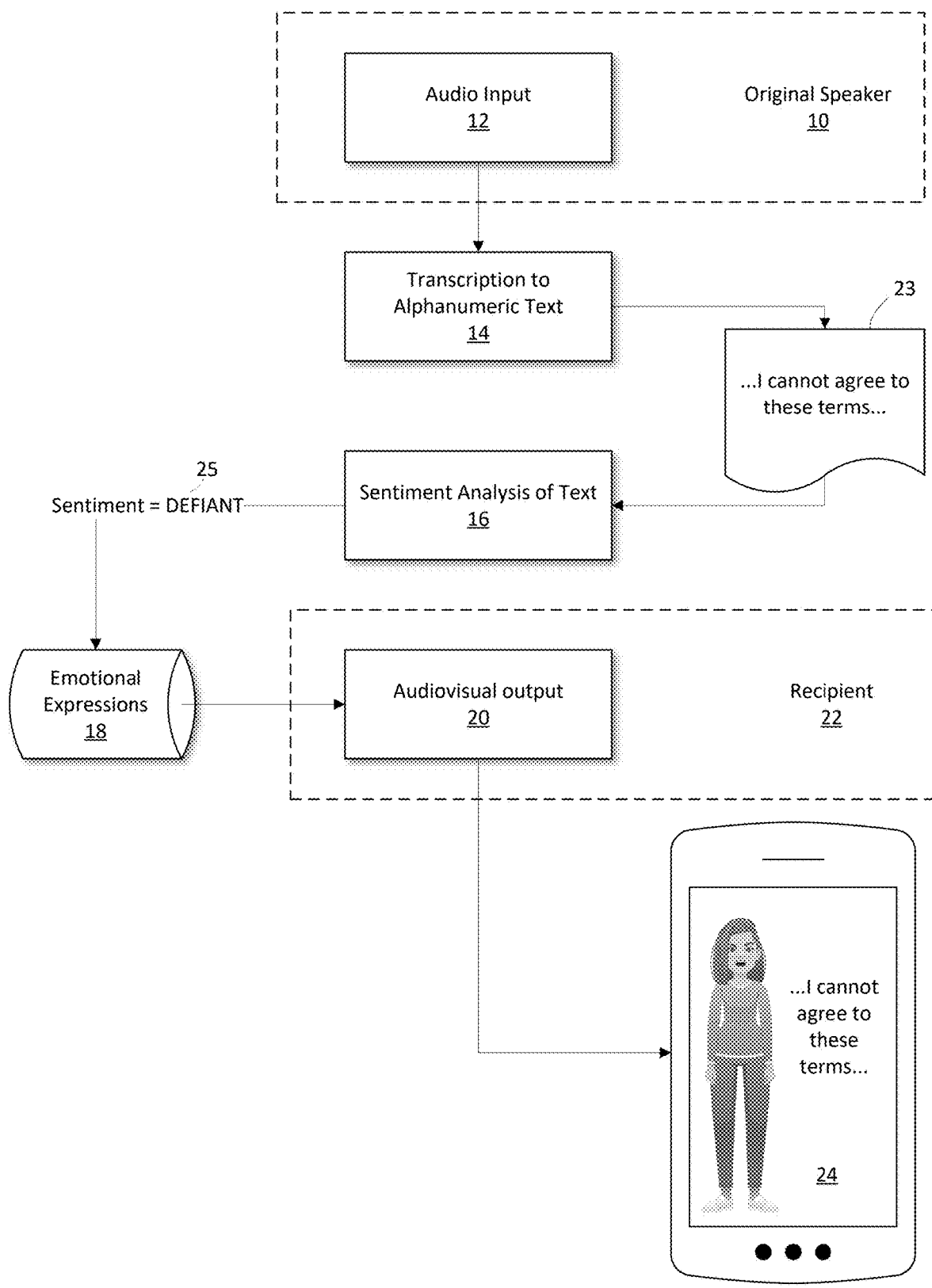
FIG. 4 is a diagrammatic view of an embodiment of the invention transcribing audio of a speaker to derive a semantic sentiment of defiance and visually conveying the sentiment to a recipient.

In FIG. 4 a process analogous to the one outlined in FIG. 3 is demonstrated, albeit with a distinction in the sentiment being manifested. The transcribed content 23 is processed through sentiment analysis 16, which discerns a sentiment categorized as "defiant," resulting in sentiment result 25. On the receipt of sentiment result 25, the system commences an inquiry into the emotional expression store 18, which is a structured data repository containing associations between sentiments and their corresponding anthropomorphic visual representations. This query is predicated on the identified sentiment, in this case, "defiant."

Subsequent to this query, the system proceeds to generate an audiovisual output 20. This output is a multi-modal representation of the sentiment result 25, incorporating both audio and visual components to holistically represent the identified sentiment. This audiovisual output 20 is ultimately displayed on display 24. The displayed output on display 24 comprises an anthropomorphic visual representation indicative of the sentiment "defiant." The term anthropomorphic, in this context, denotes a visualization that embodies human characteristics, thus attributing a human-like emotion, in this case, "defiant," to a non-human entity, i.e., the system's output. This anthropomorphic representation serves as a visual cue, allowing the recipient to ascertain the sentiment encapsulated in the original audio input. The representation is designed to provide an immediate and discernable visual indicator of the sentiment detected in the transcribed content 23.

Thus, FIG. 4 illustrates the system's capability to transcribe audio input, perform sentiment analysis, retrieve a corresponding emotional expression from a data store, and generate an anthropomorphic visual representation of the detected sentiment for display to a recipient. The embodiment of this process emphasizes the functionality of converting spoken language sentiment into a visually understandable format.

Figure 5:
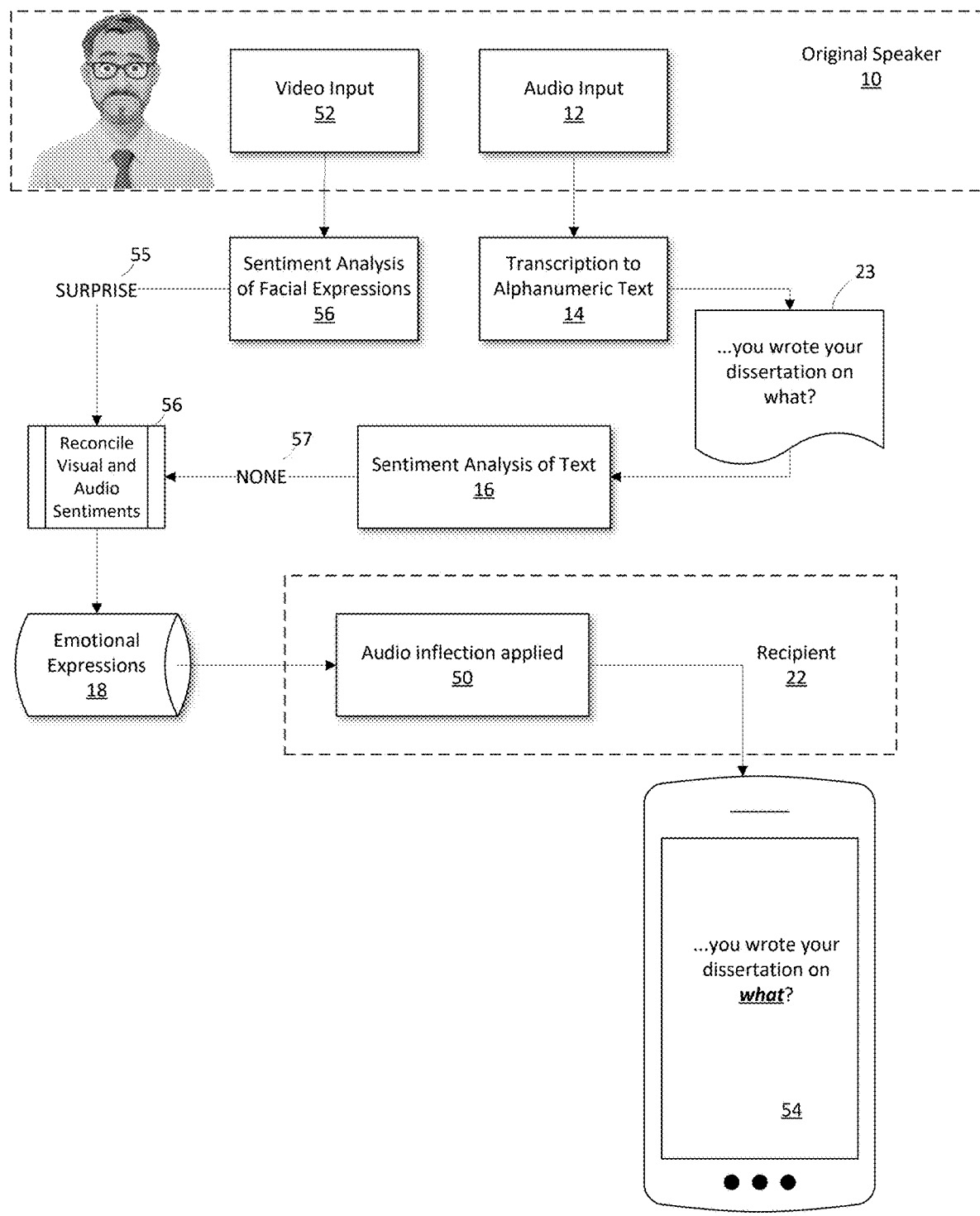
FIG. 5 is a diagrammatic view of an embodiment of the invention transcribing audio of a speaker to derive a null semantic sentiment and also capturing visual cues of surprise by the speaker and conveying the sentiment to a recipient by text stylization and audio processing of inflection on a semantically identified word.

FIG. 5 shows an embodiment of the invention which transcribes audio of a speaker to extract a null semantic sentiment and simultaneously captures visual cues of surprise from the speaker. The detected sentiment is conveyed to a recipient using text stylization and audio processing of inflection on a semantically identified word. This embodiment could be beneficial for sophisticated communications that incorporate elements of sarcasm or irony.

Herein, the original speaker 10 generates audio speech that is received by the audio input and subsequently transcribed 14 into content 23, yielding the sentence ". . . you wrote your dissertation on what?" The sentiment analysis 16, operating strictly on semantics, yields a null value 57. Concurrently, a video input 52, also received from the original speaker 10, is analyzed for facial expressions 56, which identifies a "surprise" 55. A reconciliation process 56 then compares the sentiment derived from semantic content with the sentiment detected from facial expressions, after which it consults a database of emotional expressions 18. In this instance, the output is not visual but auditory: an audio inflection 50 is applied to the otherwise monotonous audio and delivered to the recipient 22. This inflection emphasizes the final word, "what," by modifying the volume, tone, and/or pitch. This process can aid individuals with cultural, sensory, cognitive, or visual limitations in understanding the full range of communicative cues provided by the speaker 10, enhancing the signal of content, context, and sentiment for improved comprehension by recipient 22.

Figure 6:
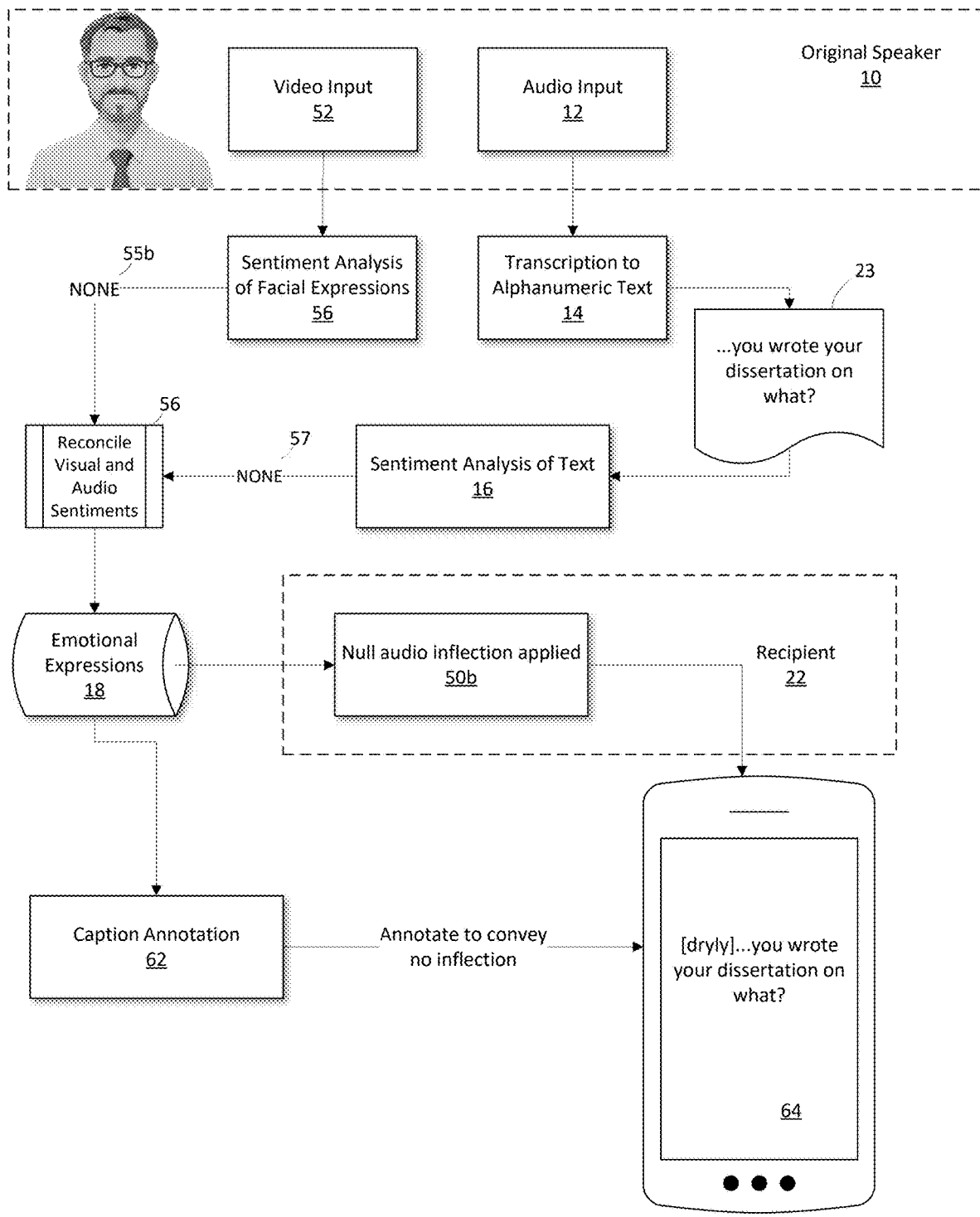
FIG. 6 is a diagrammatic view of an embodiment of the invention transcribing audio of a speaker to derive a null semantic sentiment and also capturing visual cues of no sentiment by the speaker and conveying the lack sentiment to a recipient by caption annotation.

In FIG. 6, the speaker 10 presents non-expressive facial features, and the sentiment analysis of these facial expressions returns a result of "none" 55*b*. Similarly, the sentiment analysis 16 of the spoken words, based on semantics, also returns a result of "none" 57, resulting in no audio inflection 50*b* being applied. Despite this, results 55*b* and 57 do possess communicative value as speaker 10 does not express any emotion in the question ". . . you wrote your dissertation on what?" Without any additional context, recipient 22 might interpret this content with ambiguity, uncertain whether speaker 10 asked the question in a tone of anger, disappointment, surprise, or some other sentiment. This ambiguity could potentially lead to unwarranted anxiety in the recipient as they absorb the communication. To mitigate this, an embodiment featuring caption annotation 62 conveys the absence of emotional sentiment. The display 64 annotates the caption with a bracketed note, stating that speaker 10 asked the question "dryly" and without any confrontational sentiment. This type of annotation can be particularly beneficial for individuals on the Autism spectrum, who might otherwise struggle to interpret facial or auditory cues in the information processing.

FIGS. 5 and 6 delineate the capabilities of the invention in transcribing and analyzing both audio and video inputs to capture nuanced semantic and non-semantic sentiments and conveying these sentiments effectively to the recipient using modified audio signals or caption annotations.

Figure 7:
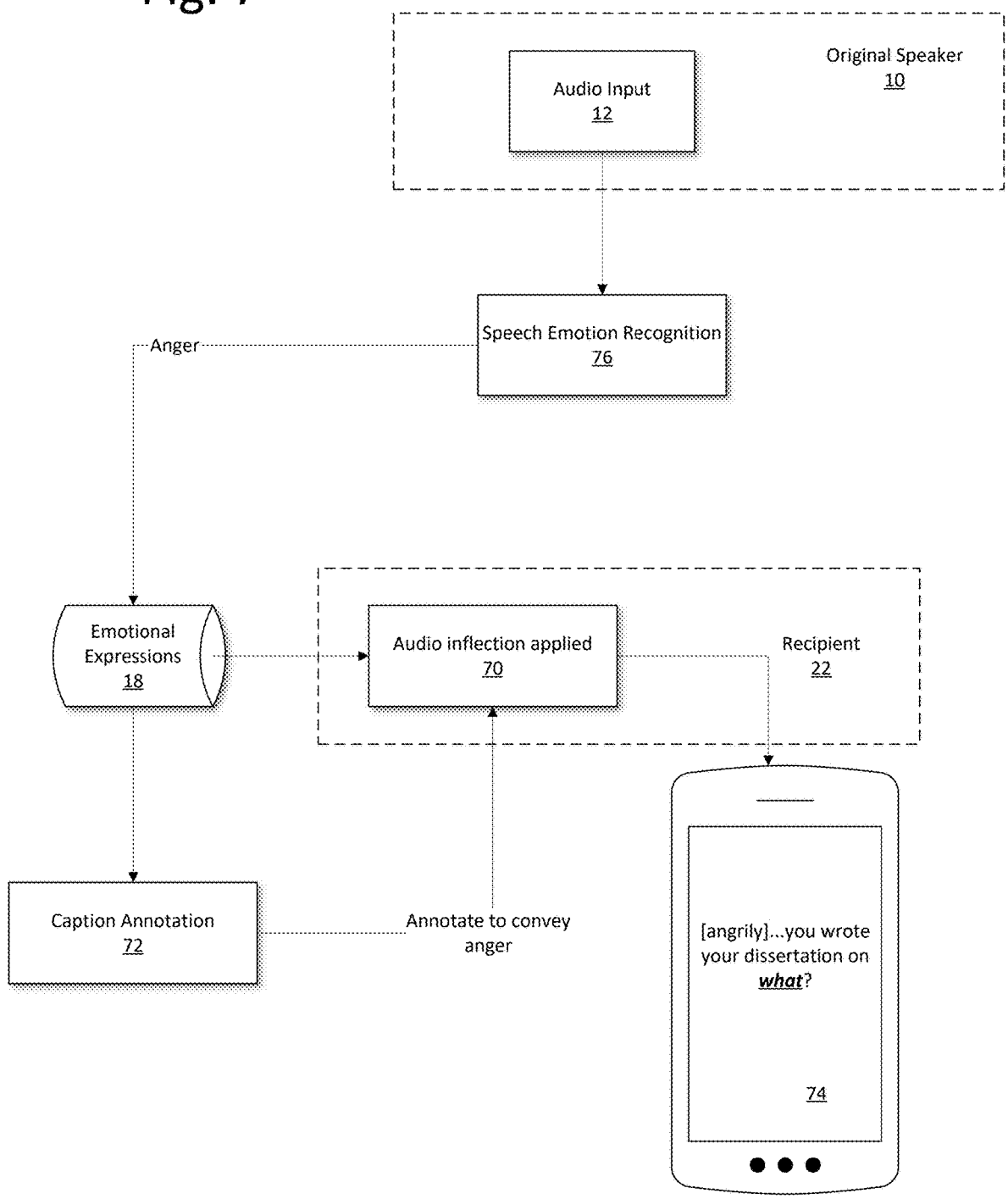
FIG. 7 is a diagrammatic view of an embodiment of the invention processing audio of a speaker to derive a sentiment of anger and conveying the sentiment to a recipient by caption annotation, transcription text stylization, and audio processing of inflection on a semantically identified word.

In contradistinction to FIG. 6, FIG. 7 demonstrates an embodiment of the invention that processes the audio of a speaker to extract a sentiment of anger and conveys this sentiment to a recipient using caption annotation, transcription text stylization, and audio processing of inflection on a semantically identified word. Specifically, speech emotion recognition 76 processes the audio input 12 received from speaker 10, yielding a result categorized as "anger". This analysis is performed by applying algorithms designed to detect emotional cues in speech. Post this emotion recognition, a database of emotional expressions 18 is consulted, and two additional processes are triggered for output to recipient 22.

Firstly, caption annotation 72 is applied, which amends the text caption displayed in display 74 by appending the annotation "[angrily]". This textual indication is intended to specify the emotional context in which the statement was made, aiding the recipient's understanding.

Secondly, an enhanced audio inflection 70 is applied to the final word, "what," in a concurrent audio output directed to recipient 22. The term "enhanced audio inflection" refers to intentional modifications in the audio characteristics-such as pitch, volume, or tone—to underscore the emotional context. Thus, this embodiment processes a single modality, the audio input 12, and generates two output modalities: caption and audio. These outputs serve to enhance the communication received by the recipient 22.

Figure 8:
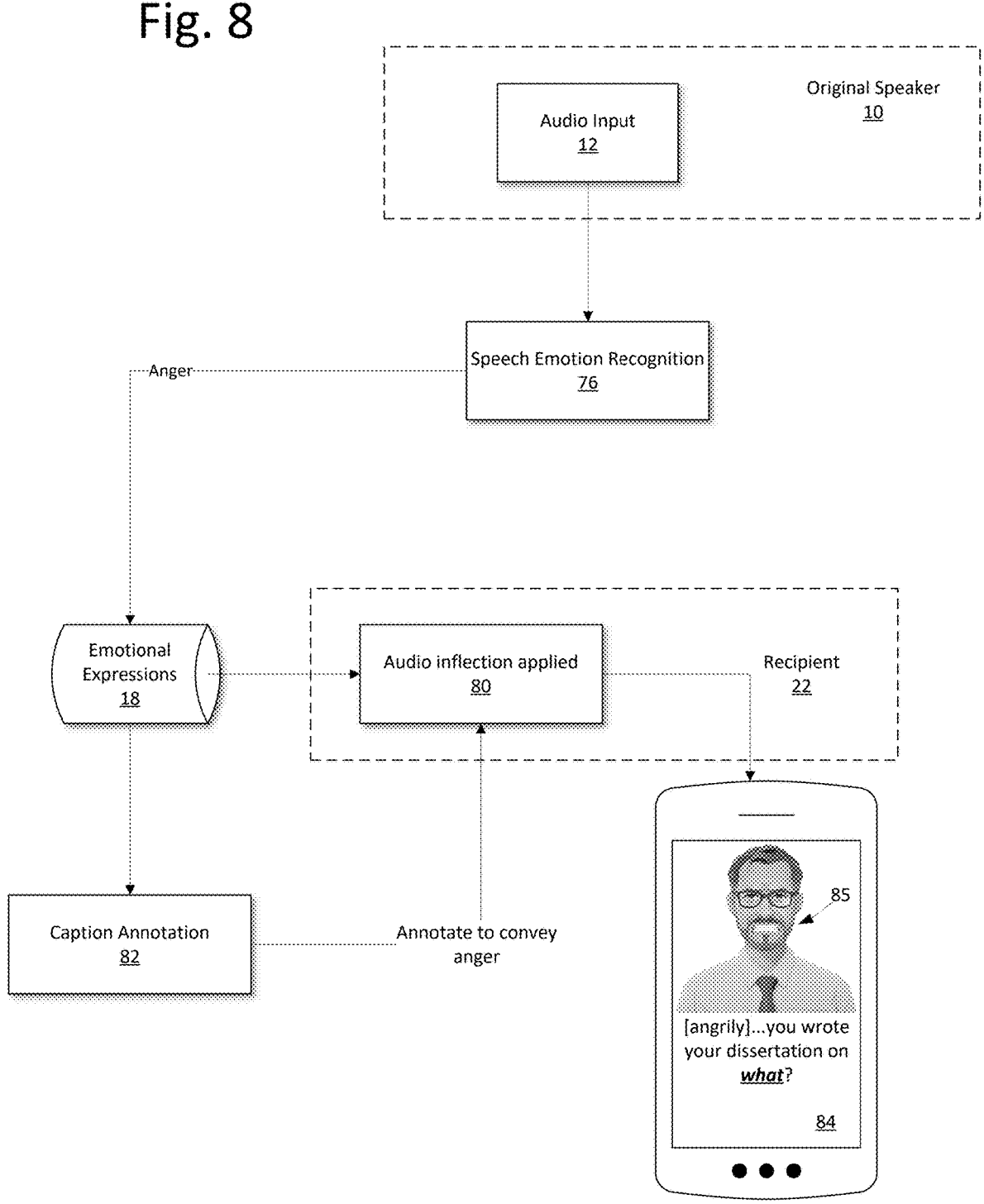
FIG. 8 is a diagrammatic view of an embodiment of the invention processing audio of a speaker to derive a sentiment of anger and conveying the sentiment to a recipient by caption annotation, transcription text stylization, audio processing of inflection on a semantically identified word, and a visually rendered avatar display conveying the sentiment by facial expression.

Turning to FIG. 8, an embodiment is shown audio from speaker 10 is processed to determine a sentiment of anger and communicates this sentiment to recipient 22. This is achieved through caption annotation, transcription text stylization, audio processing of inflection on a semantically identified word, and an avatar display 85 visually representing the sentiment through facial expression.

In essence, the original audio waveform captured at input 12 is transformed into four distinct generative modalities, each serving to amplify the information conveyed by speaker 10. The visual avatar 85, a graphical representation of a human or human-like entity, is employed to mimic human facial expressions, thus visually reflecting the detected sentiment of anger. This multi-modal output, combining text, audio, and visual cues, provides an enriched signal of the information initially communicated by the speaker 10.

Figure 9:
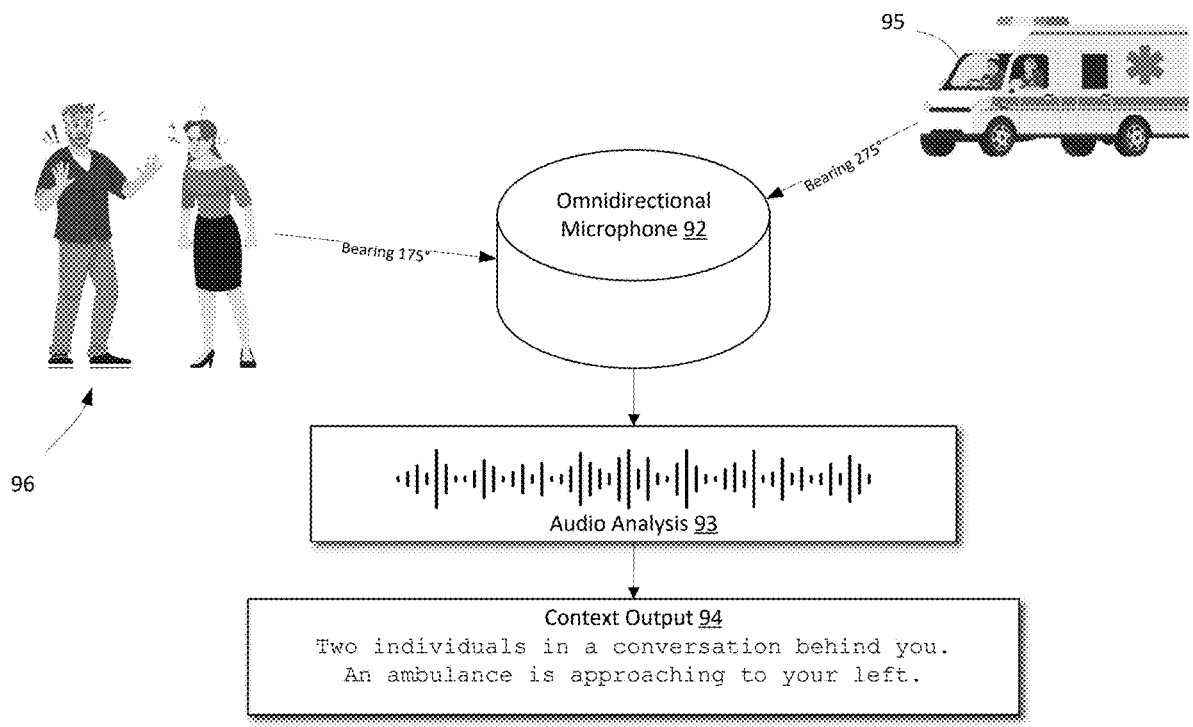
FIG. 9 is a diagrammatic view of an embodiment of the invention processing audio of an environment and conveying context and spatial direction to a recipient by audible speech.
Figure 9:

FIG. 9 illustrates an embodiment of the invention that processes environmental audio and communicates contextual and spatial information to recipient 97 through audible speech. In this particular figure, an omnidirectional microphone 92 is employed to record ambient sounds along with their respective directions of origin. The omnidirectional microphone 92 is capable of recording sounds coming from all directions. However, it is worth noting that this microphone could alternatively consist of an array of microphones distributed across different positions to capture sounds more accurately and determine their respective directions of origin more effectively.

The scene depicted in the figure involves two individuals 96 engaged in a verbal discussion located at a bearing of 175 degrees from the forward-facing, zero-degree orientation of microphone 92. Concurrently, the microphone detects an ambulance siren 95 at a bearing of 275 degrees. Audio analysis 93 processes these captured audio waveforms, with the context output 94 providing a descriptive report of the detected waveforms. For the purpose of this example, recipient 97, who is visually impaired and potentially hard of hearing, receives this contextual information through a text-to-speech audio transmission adjusted to a perceivable volume. Recipient 97 is equipped with one or more devices capable of detecting their forward path or facing direction. Accordingly, the context output 94 is tailored and delivered relative to the current spatial position and orientation of recipient 97.

Figure 10:
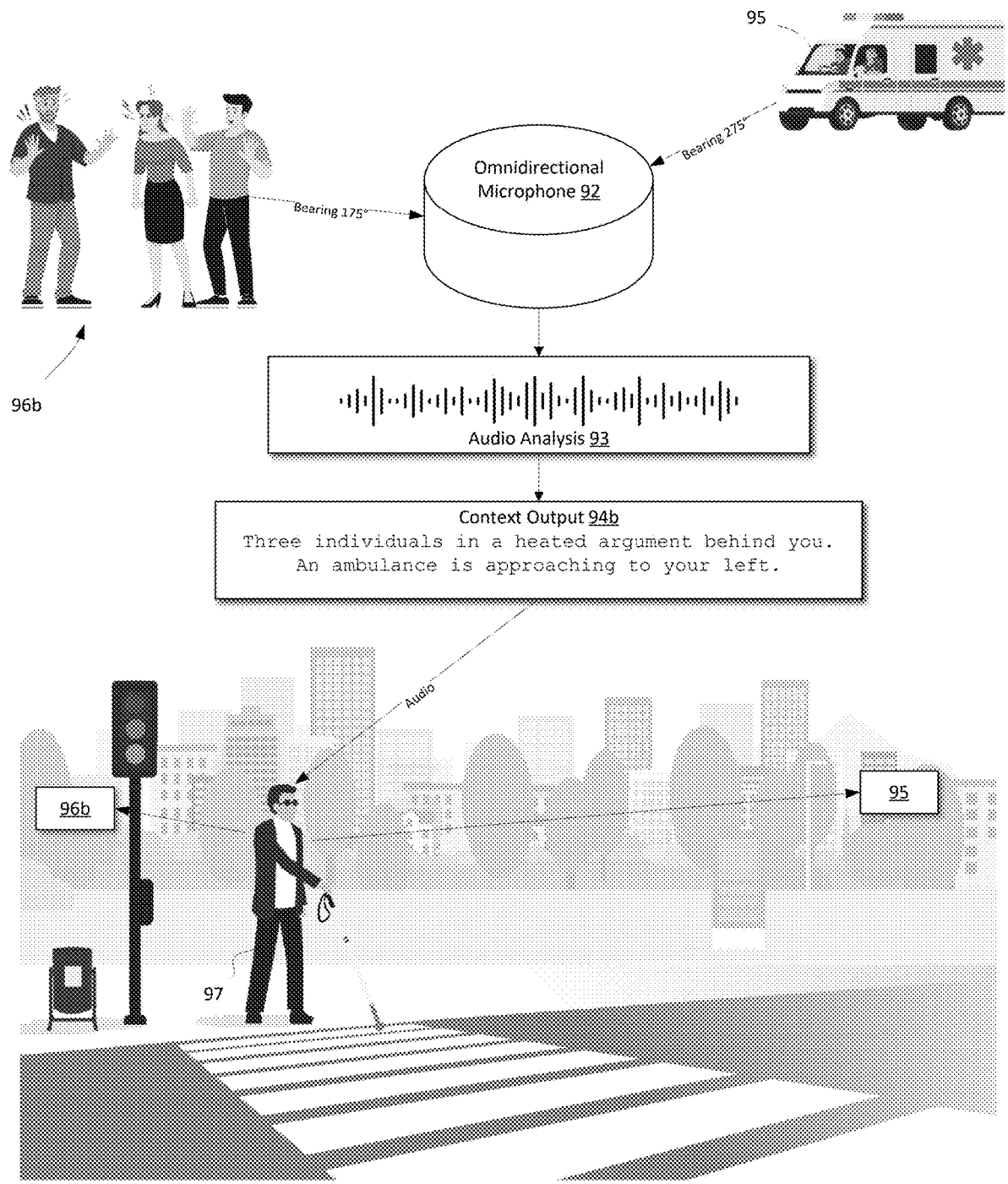
FIG. 10 is a second diagrammatic view of an embodiment of the invention processing audio of an environment and conveying context and spatial direction to a recipient.

Transitioning to FIG. 10, this represents another diagrammatic view of an embodiment of the invention that processes environmental audio and conveys contextual and spatial information to a recipient. However, in this instance, the audio analysis 93 detects three individuals 96*b* engaged in a dispute, as opposed to the two individuals in the previous example.

This altercation is identified not through video surveillance but via audio analysis 93. This particular detection and notification mechanism could be particularly useful for recipient 97 who may have sensory limitations and might not be otherwise aware of a verbal confrontation that could escalate into a physical altercation. This embodiment, therefore, enhances the situational awareness of recipient 97 by providing auditory cues concerning the immediate environment.

Figure 11:
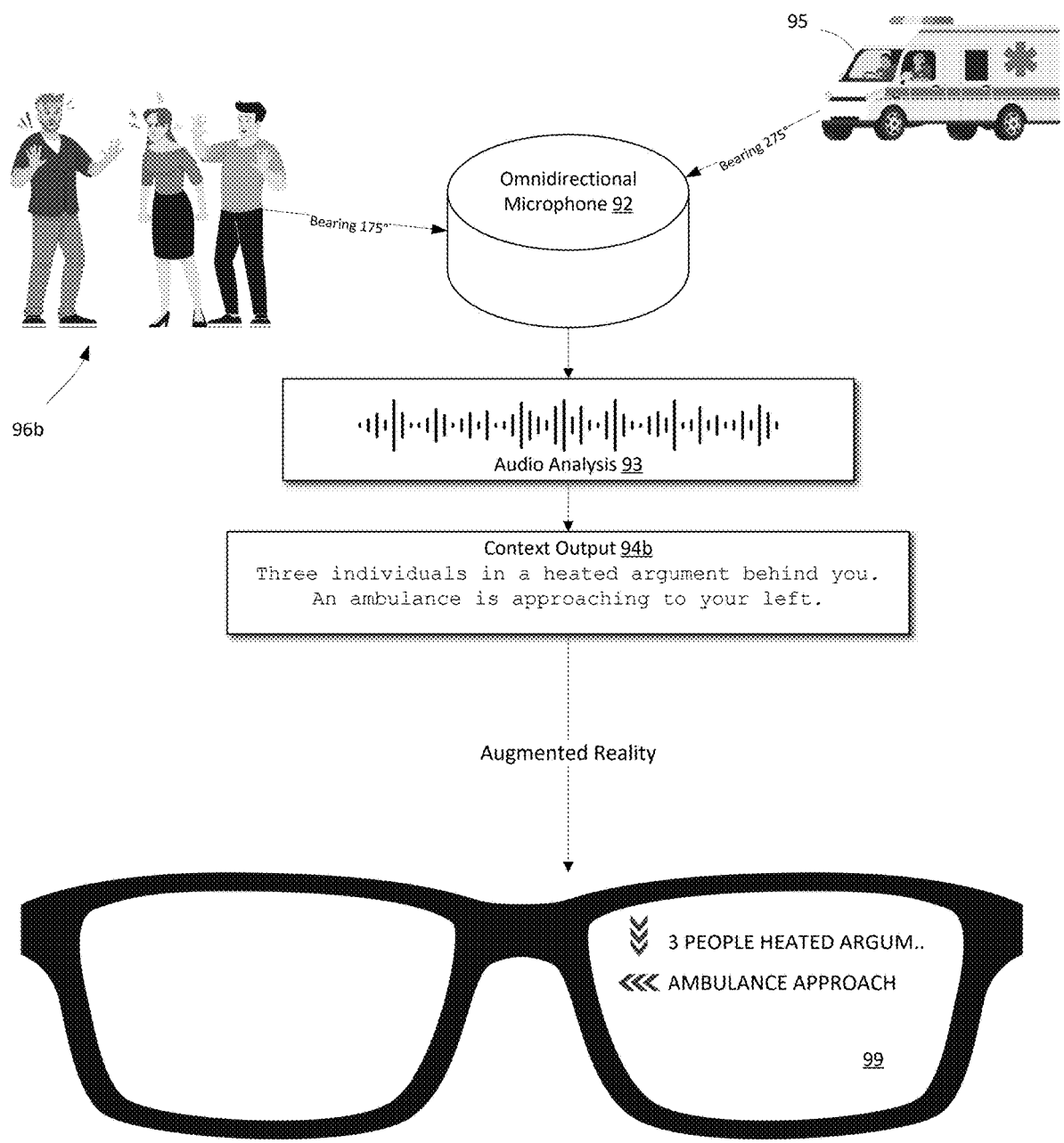
FIG. 11 is a diagrammatic view of another embodiment of the invention processing audio of an environment and conveying context and spatial direction to a recipient through augmented reality equipment.

FIG. 11 presents a schematic representation of an embodiment of the invention which processes environmental audio and transmits the contextual and spatial information to a recipient by means of Augmented Reality (AR) equipment. In this scenario, audio input from individuals engaged in a verbal altercation 96*b* and an ambulance siren 95 is collected by microphone 92.

Subsequently, this audio input is processed by audio analysis 93, producing data for context output 94*b*. The resulting contextual information is then displayed on an AR headset 99, equipped with corresponding directional markers. Assuming the recipient is hearing impaired, the AR headset 99 offers an alternative mode of perceiving and understanding audible information that they would not ordinarily receive. Thus, this embodiment of the invention offers generative, transformative information to the recipient.

Figure 12:
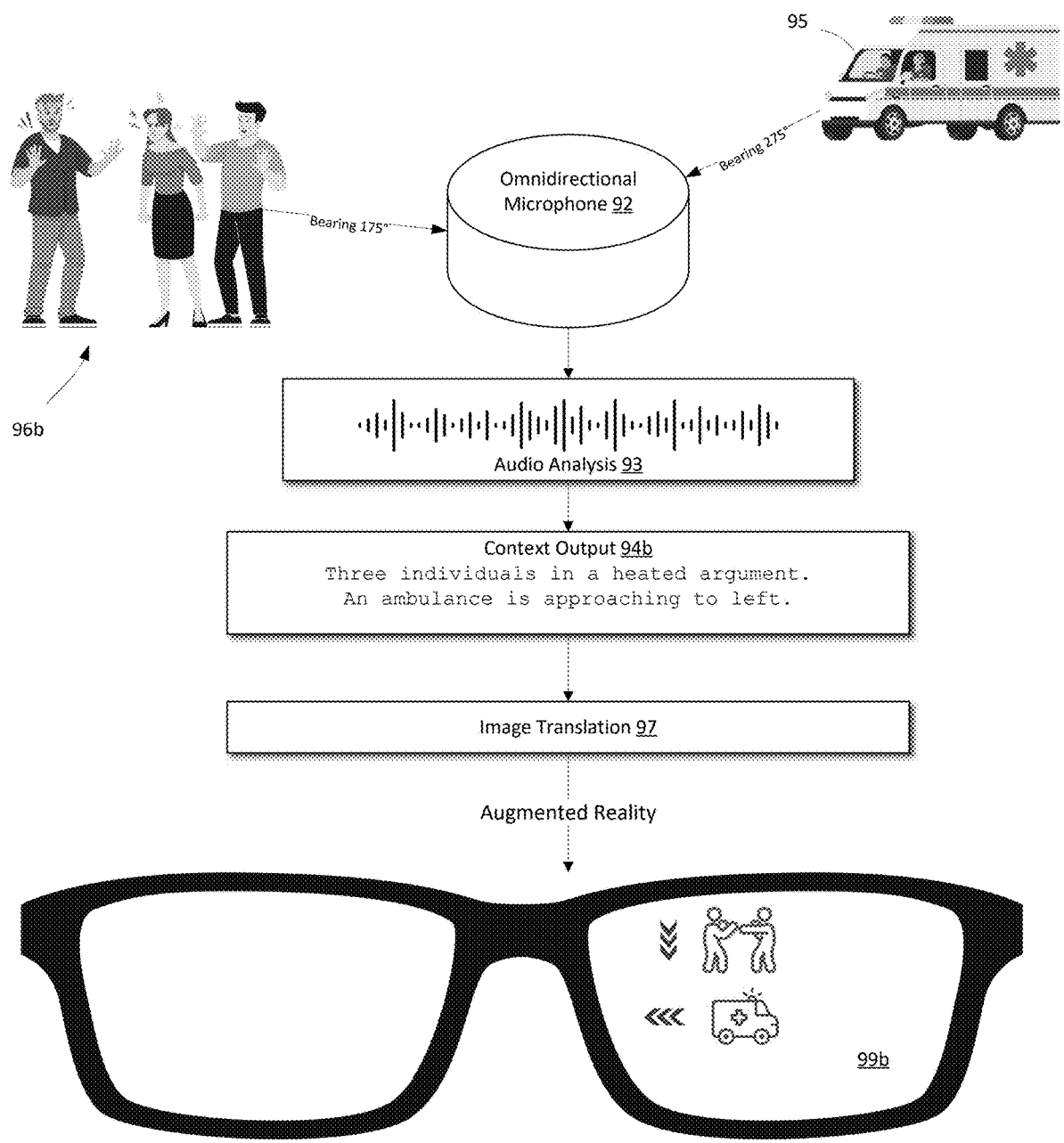
FIG. 12 is a diagrammatic view of another embodiment of the invention processing audio of an environment and conveying context and spatial direction to a recipient through augmented reality equipment applying an addition step of translating context from text to symbology.

Transitioning to FIG. 12, this diagram presents an alternative embodiment of the invention which also processes environmental audio and delivers the associated context and spatial information to a recipient using AR equipment. However, in this instance, instead of displaying alphanumeric text representing the audio source on the AR headset, the embodiment utilizes symbolic representations. The specific symbols are displayed on AR headset 99*b*, providing the recipient with an abstract yet informative interpretation of the audio source's nature and location.

Figure 13:
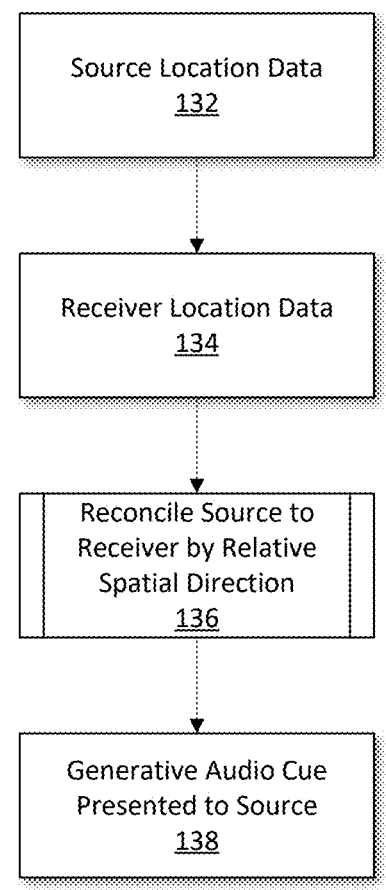
FIG. 13 is a process flow for generating audio cues based on relative spatial positions of sources and a receiver.

FIG. 13 is a process flow for generating audio cues based on relative spatial positions of sources and a receiver. Source location data 132 and receiver location data 134 (including orientation) are reconciled 136 wherein generative audio cues are presented to the source 138 by spatial audio. The process of capturing and reproducing audio that can simulate its direction and distance from the listener, thereby creating an immersive sound environment, is an important aspect of audio engineering. This process, known as spatial audio or surround sound, can create a three-dimensional aural experience and is most commonly used in home cinema systems, virtual reality, and in the production of music and video games. The capture of spatial audio begins with the use of an array of microphones positioned strategically to record sound coming from different directions. The most basic setup involves using two microphones (stereo setup), but it can be more complex, with multiple microphones in various configurations. For instance, the Ambisonics technique utilizes a special type of microphone known as a SoundField microphone, which comprises four sub-cardioid microphones arranged in a tetrahedral fashion. These mics record sound pressure and the velocity of sound in three dimensions, which can be combined to form a full spherical representation of the sound field. Once the sound is captured, it is then processed using techniques like binaural recording, which replicates the way human ears hear sounds from different directions and distances. This process uses Head-Related Transfer Functions (HRTFs), mathematical filters that model how an ear receives a sound from a point in space. Combining the information from both ears allows us to localize sound in space.

Virtual reality and video game applications often use binaural audio over headphones to recreate spatial sound. This uses HRTFs to process the audio so that it seems like it's coming from specific locations in the 3D space around the listener. It's a bit different than traditional surround sound because it only requires two channels (one for each ear) but can still effectively convey the direction and distance of sounds. To achieve an enhanced synchronization of the relative position of the sound, delays and phase shifts are employed, which are types of audio effects that can be used to simulate the spatial characteristics of sound. This includes the Doppler effect (changes in frequency and wavelength caused by motion) and the Haas effect (a psychoacoustic phenomenon where sounds arriving within 25-35 milliseconds of each other are perceived as a single sound).

Figure 14:
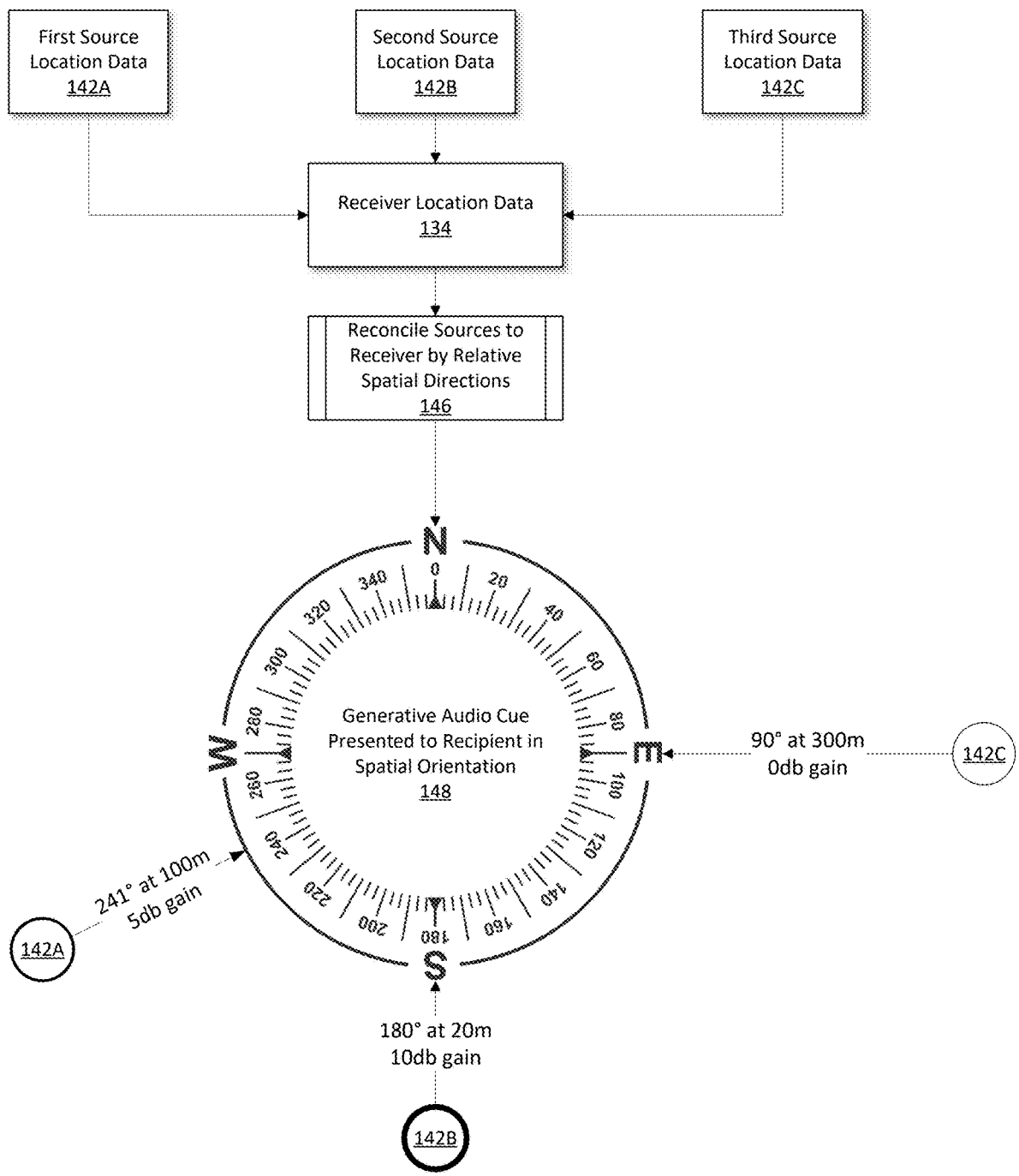
FIG. 14 is a process flow for generating audio cues based on relative spatial positions of sources and a receiver with illustrative examples of direction and distance.

FIG. 14 is a process flow for generating audio cues based on relative spatial positions of sources and a receiver with illustrative examples of direction and distance. First 142A, Second 142B and Third 142C source locations are received 134 with information on their direction and distance. Receiver 148 and source spatial direction and orientation are reconciled 146 wherein generative audio cues are presented to recipient. Here First 142A is localized using HRTFs as a generative audio cues to recipient at a relative X-axis direction of 241 degrees. Audio cues, also known as auditory icons or earcons, are crucial non-speech sound components that devices utilize to communicate information to the user. One commonly used sound is the 'beep', which can be adjusted in a variety of ways to convey different meanings. The primary variations of a beep sound are frequency (pitch), duration, intensity (volume), and timbre. Frequency modulation enables differentiation among alerts by altering the perceived pitch of the beep. A higher frequency typically signifies urgency or an elevated level of importance. Duration, or the temporal extent of the sound, also serves as a distinguishing factor. A brief beep might indicate a minor, easily correctable discrepancy, while a longer beep could be used to indicate a more serious or persistent issue. Intensity variations allow for an adjustment in the loudness of the beep, a feature which can be crucial in environments with differing ambient noise levels. A softer beep might be used in a quieter setting, or when the alert is of a non-critical nature, while a louder beep can cut through ambient noise and draw attention to a critical issue. Lastly, the timbre, which refers to the quality or color of the sound, can be adjusted by manipulating the waveform. Simple waveforms like sine waves produce pure tones, while more complex waveforms can generate richer, more distinctive beeps.

All these variations can be used singly or in combination to create a plethora of distinct audio cues. Additionally, sequences or patterns of beeps can be utilized to convey more complex or specific information, further enhancing the communicative potential of auditory icons. The crafting of these sounds must be done with careful consideration of the psychoacoustic principles, to ensure they effectively attract attention and convey the intended meaning to the user. However, in the present example, these variations are used to convey relative distance between First 142A and recipient 148. In the example, the 142A-148 distance is 100 meters so to simulate distance, a 5 db gain is applied although this could also be a modification of pitch or other waveform modification. Second 142B is only 20 meters from 148 so gain is 10 db and is spatially oriented immediately behind 148. Third 142C is directionally to the right (or 90 degrees) of 148 but at 300 meter distance no gain is applied to the audio cue volume.

Figure 15A:
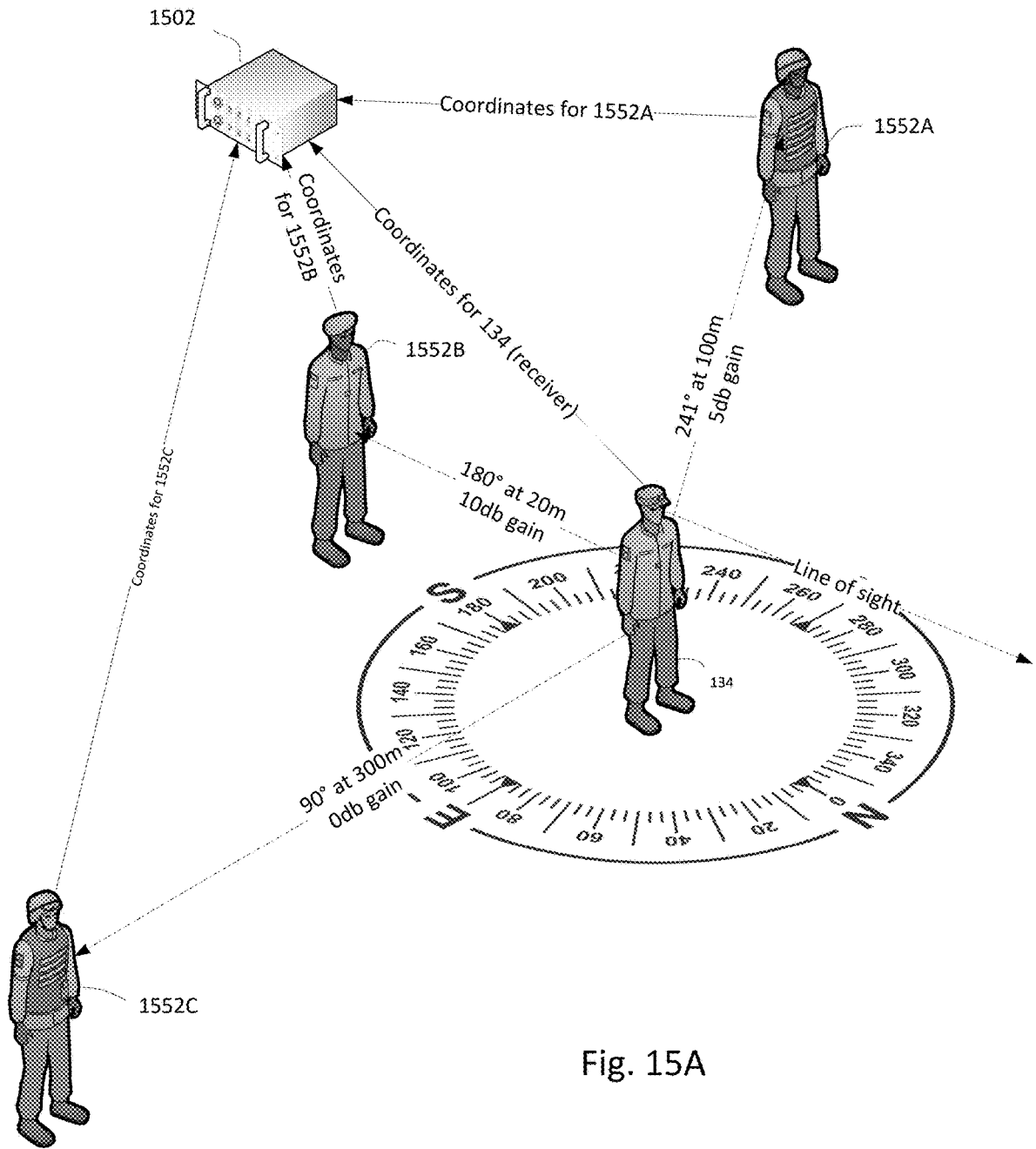
FIG. 15A is an isometric conceptual illustration of a soldier recipient of generative audio cues conveying relative distance and direction of his platoon.

FIG. 15A is an isometric conceptual illustration of a soldier recipient of generative audio cues conveying relative distance and direction of his platoon. Similar to the more abstract illustration in FIG. 14, receiver 134 is spatially to soldier 1552C at a 90 degree bearing, soldier 1552B at an 180 degree bearing and soldier 1552A at a 241 degree bearing. Processor 1502 receives location data which could originate from global positioning, radio signals, visual data or a combination thereof. In this case, soldiers 1552A-C make no discernable or recorded sound respective to sensory detection. The audio cues presented spatially to recipient 134 are entirely generative. Rather than recipient 134 checking relative positions of soldiers 1552A-C by looking at a display or receiving verbal descriptions of the relative locations, the audio cues allow recipient 134 to perceive their locations in an already task-saturated environment.

Figure 15B:
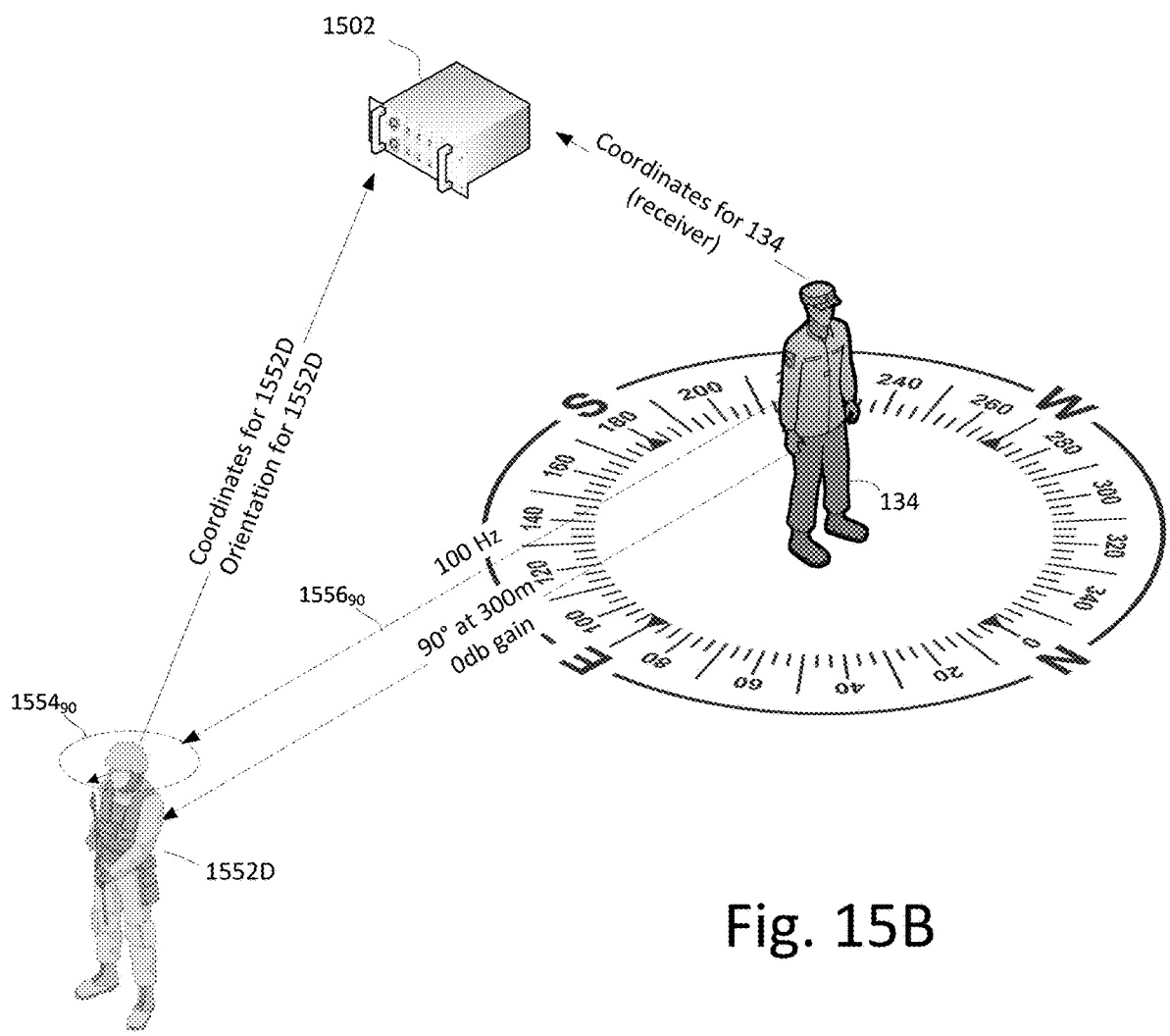
FIG. 15B is an isometric conceptual illustration of a first soldier receiving generative audio cues conveying relative distance, direction and the trajectory of visual focus of a second soldier facing away from the first soldier.

FIG. 15B is an isometric conceptual illustration of a first soldier recipient 134 of generative audio cues conveying relative distance, direction and trajectory of visual focus on a second soldier 1552D. Soldier 1552D is at the 90 degree position to first soldier 134. At 300 meters way, a ping for soldier 1552D has zero gain in volume and is spatially broadcast to the left orientation of soldier 134. However, second soldier 1552D has a visual orientation 155490 which is 90 degrees relative to a zero degree (North-bearing) which is the focus orientation of soldier 134. Head-mounted instruments on soldier 134 and soldier 1552D provide data on the direct of each respective visual focus direction. As soldier 1552D is facing away from soldier 134, the frequency of a ping indicating the presence of soldier 1552D is changed. In an exemplary embodiment of the invention, facing away produces the lowest tone, for example 100 Hz denoted as 1556$_{90}$. The ping may be constant, at intervals or at variable intervals responsive to distance. While the sound generation is entirely computational and synthetic, distance may be conveyed by pinging at a faster rate (e.g., shorter interval) as soldier 1552D moves closer to soldier 134. This is similar to how sonar would intuitively operate. As soldier 1552D moves away from soldier 134, the interval is longer. However, by the low frequency, ping interval and/or audio gain, and audio-spatial direction, soldier 134 can identify the relative location, distance and visual focus on soldier 1552D.

Figure 15C:
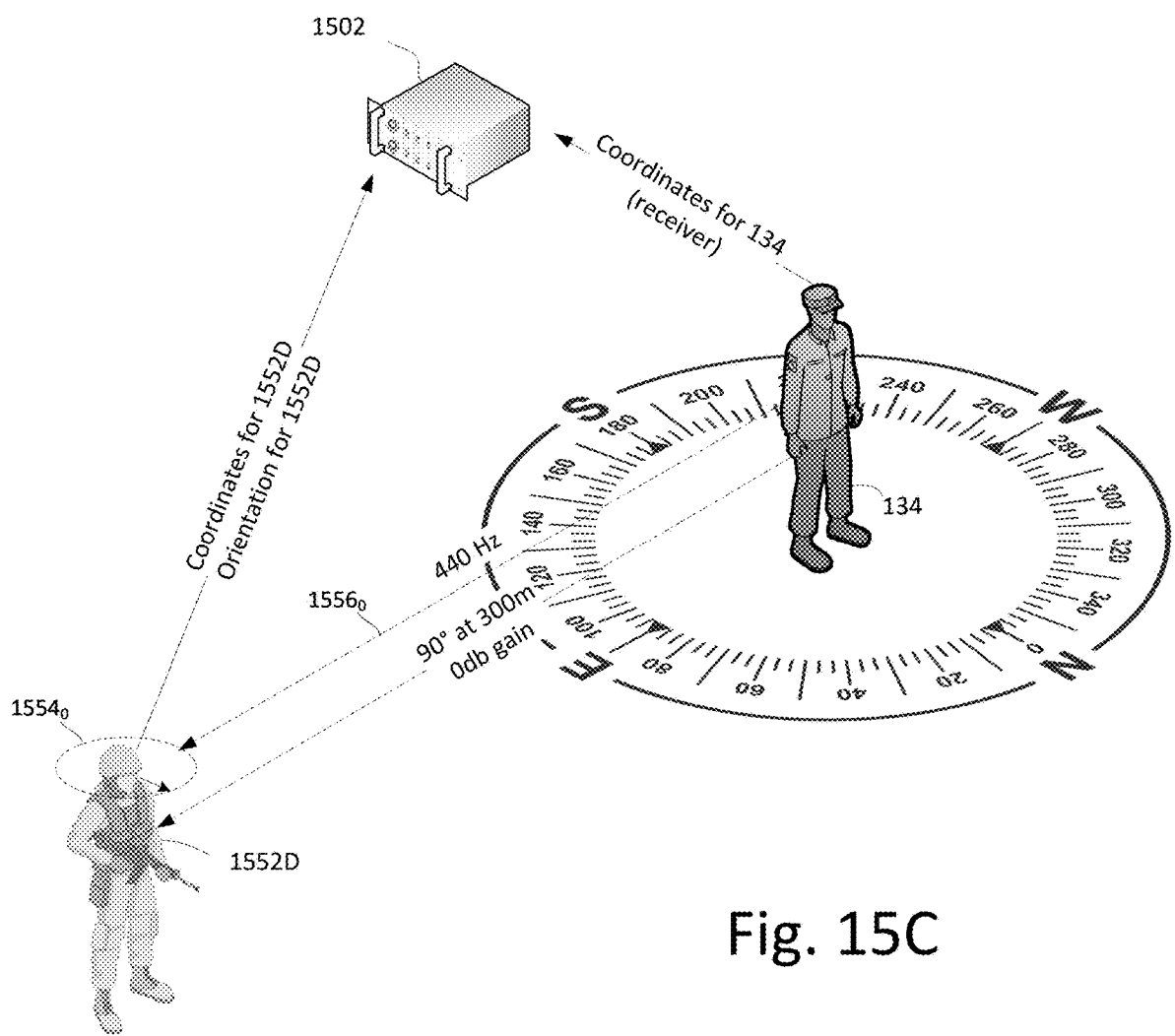
FIG. 15C is an isometric conceptual illustration of a first soldier receiving generative audio cues conveying relative distance, direction and the trajectory of visual focus of a second soldier facing the same direction as the first soldier.
Figure 15D:
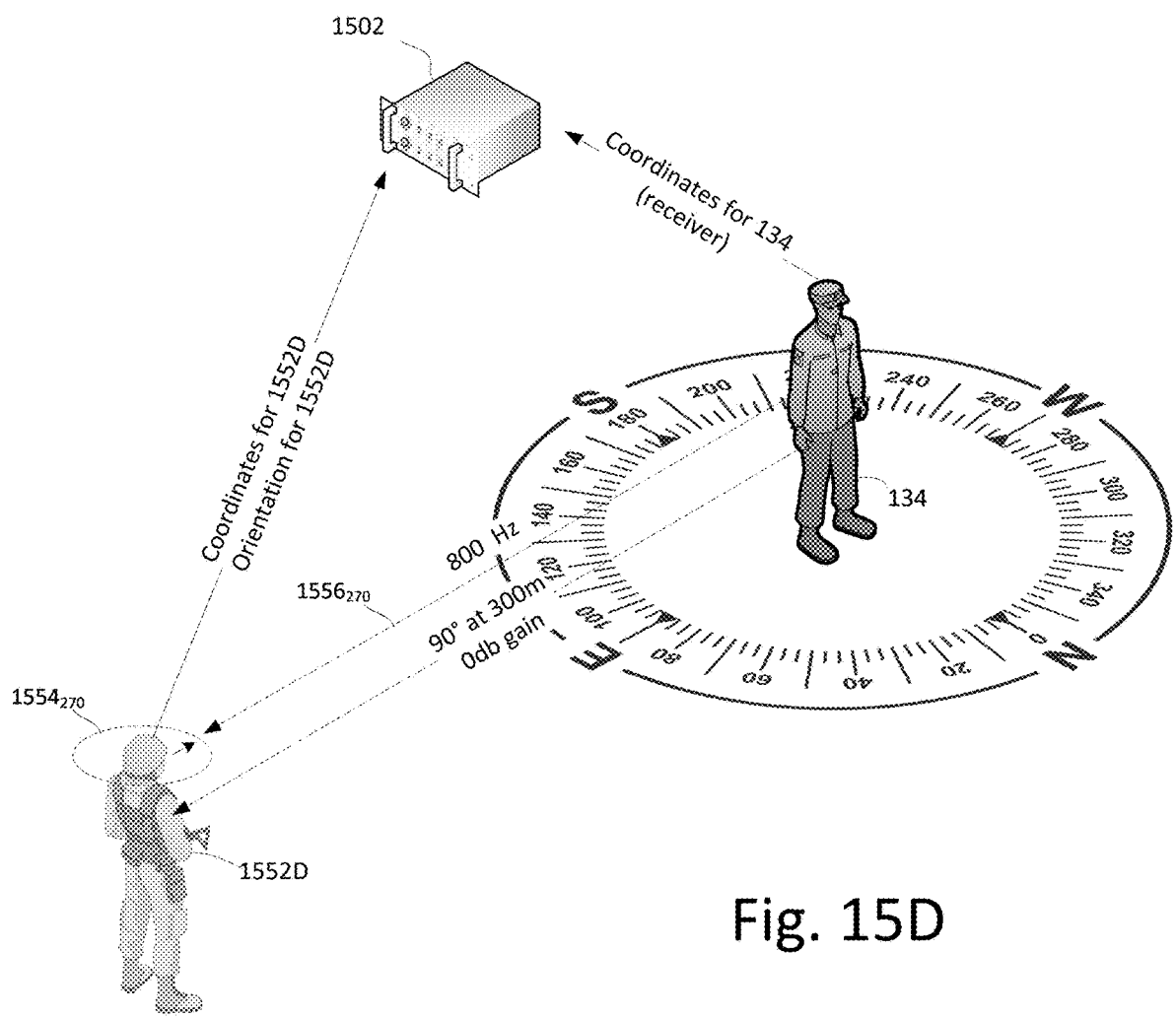
FIG. 15D is an isometric conceptual illustration of a first soldier receiving generative audio cues conveying relative distance, direction and the trajectory of visual focus of a second soldier facing towards the first soldier.

In FIG. 15C, soldier 1552D reorients visual focus to a zero-degree bearing 1554$_0$. This is conveyed to soldier 134 by a change in the frequency of the audio from 100 Hz in FIG. 15B, to 440 Hz in FIG. 15C. Soldier 1552D position has not changed between FIGS. 15B and 15C, only the direction of visual focus. In FIG. 15D, soldier 1552D changes visual focus to 270 degrees (1554$_{270}$) relative to the visual focus of soldier 134. In this example, the frequency of the audio ping 1556$_{270}$ is increased to 800 Hz conveying to soldier 134 that soldier 1552D has a direct visual focus on him.

Figure 15E:
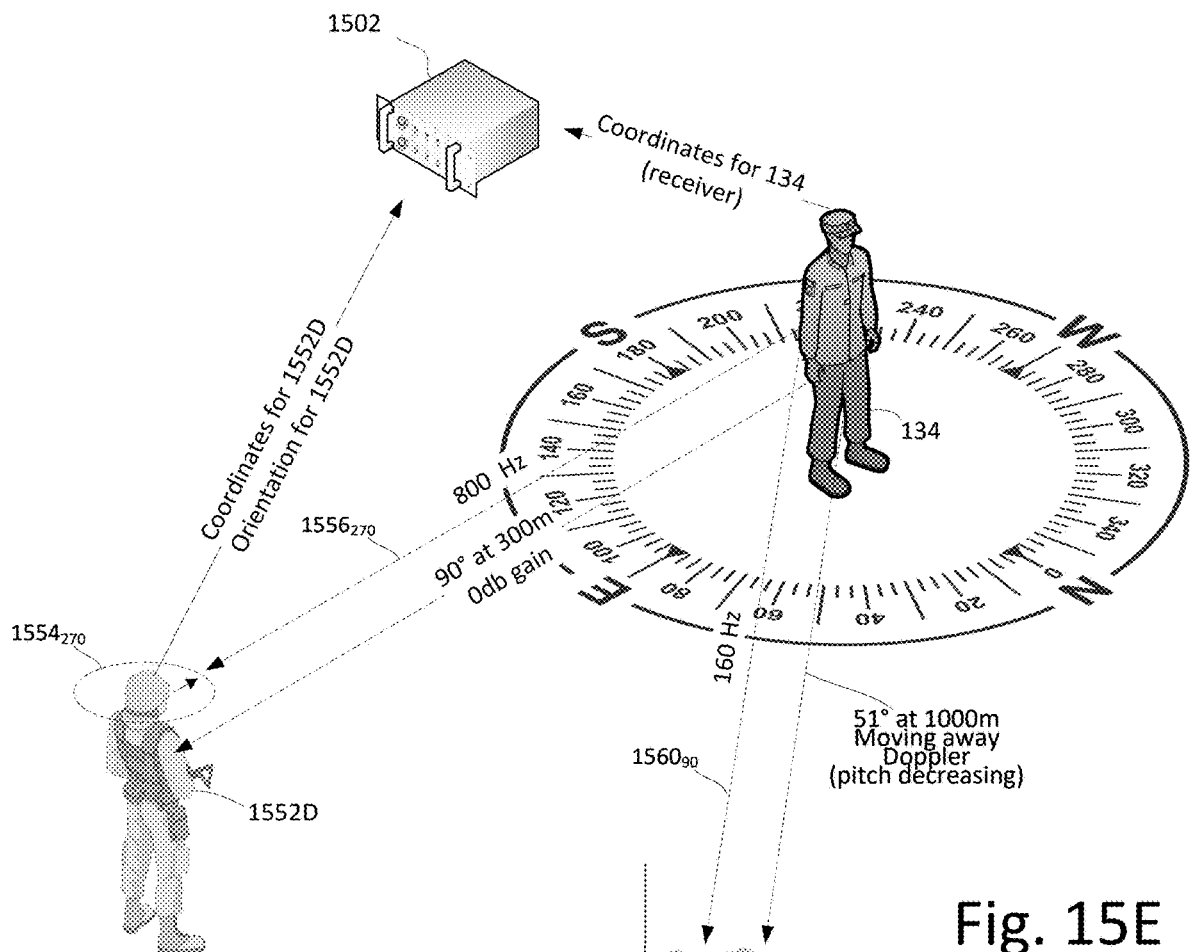
FIG. 15E is an isometric conceptual illustration of a first soldier receiving generative audio cues conveying relative distance, direction and the trajectory of an armament orientation directed away from the first soldier.
Figure 15F:
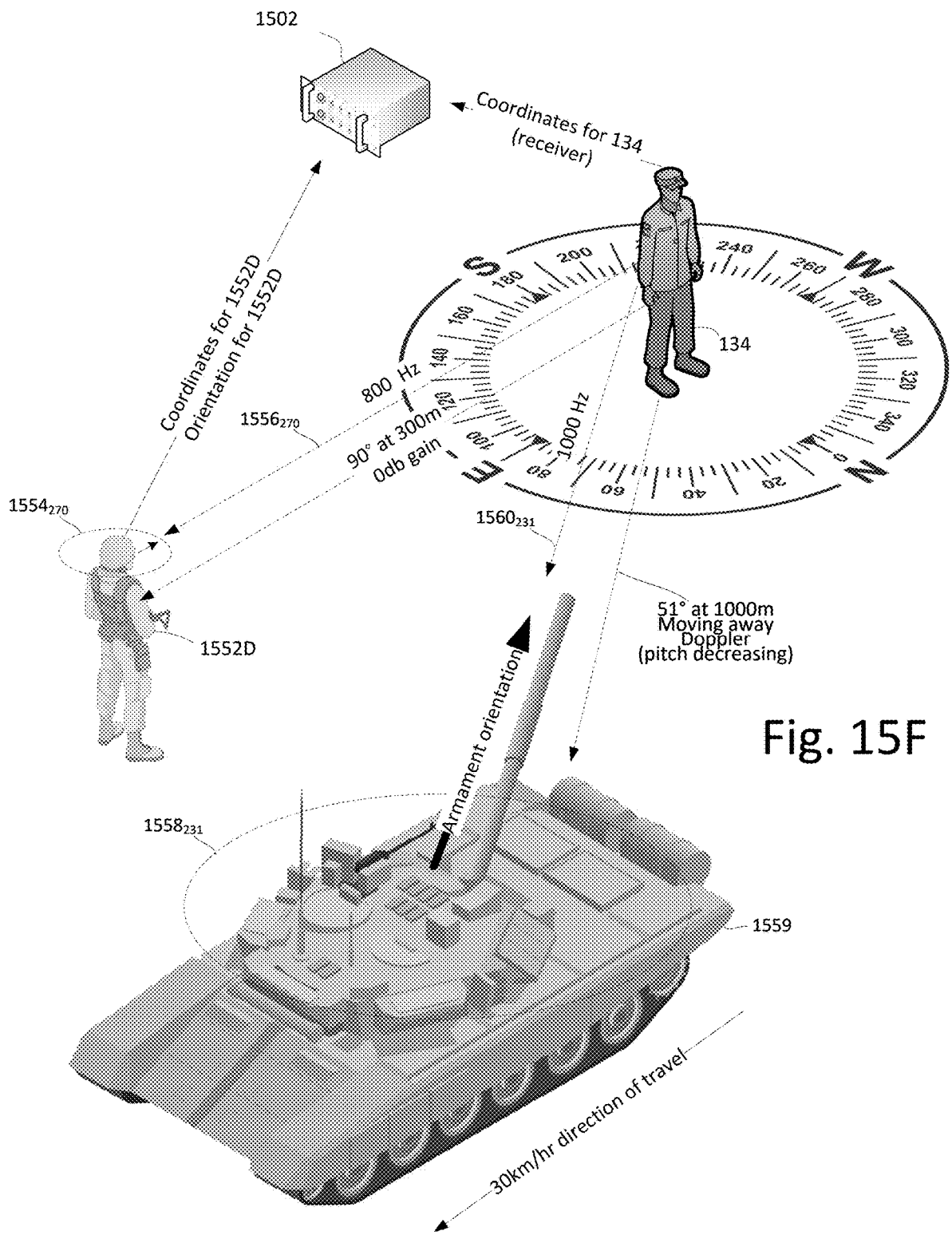
FIG. 15F is an isometric conceptual illustration of a first soldier receiving generative audio cues conveying relative distance, direction and the trajectory of an armament orientation directed at the first soldier.

This approach can provide critical utility for avoiding friendly fire between allied or common forces. As shown in FIG. 15E, tank 1559 is moving 30 km/hr away from soldier 134 at a 51-degree bearing at a distance of 1,000 meters. Soldier 134 is able to assimilate movement of tank 1559 by a Doppler effect of decreasing pitch of ping or constant audio synthetically generated to represent tank 1559. Of note, armament orientation 1558$_{90}$ of tank 1559 is conveyed by pitched modification 1560$_{90}$ setting the frequency at a relatively low 160 Hz which conveys to soldier 134 that the monitored firing direction of tank 1559 is away from his position. In contradistinction, FIG. 15F shows tank 1599, still moving away in the same direction as FIG. 15E, turning the armament orientation to 1558$_{231}$ directly towards soldier 134. Frequency setting 1560$_{231}$ is maximized to 1,000 Hz to convey to soldier 134 that the primary weapon of tank 1559 is trained in his direction.

Figure 16A:
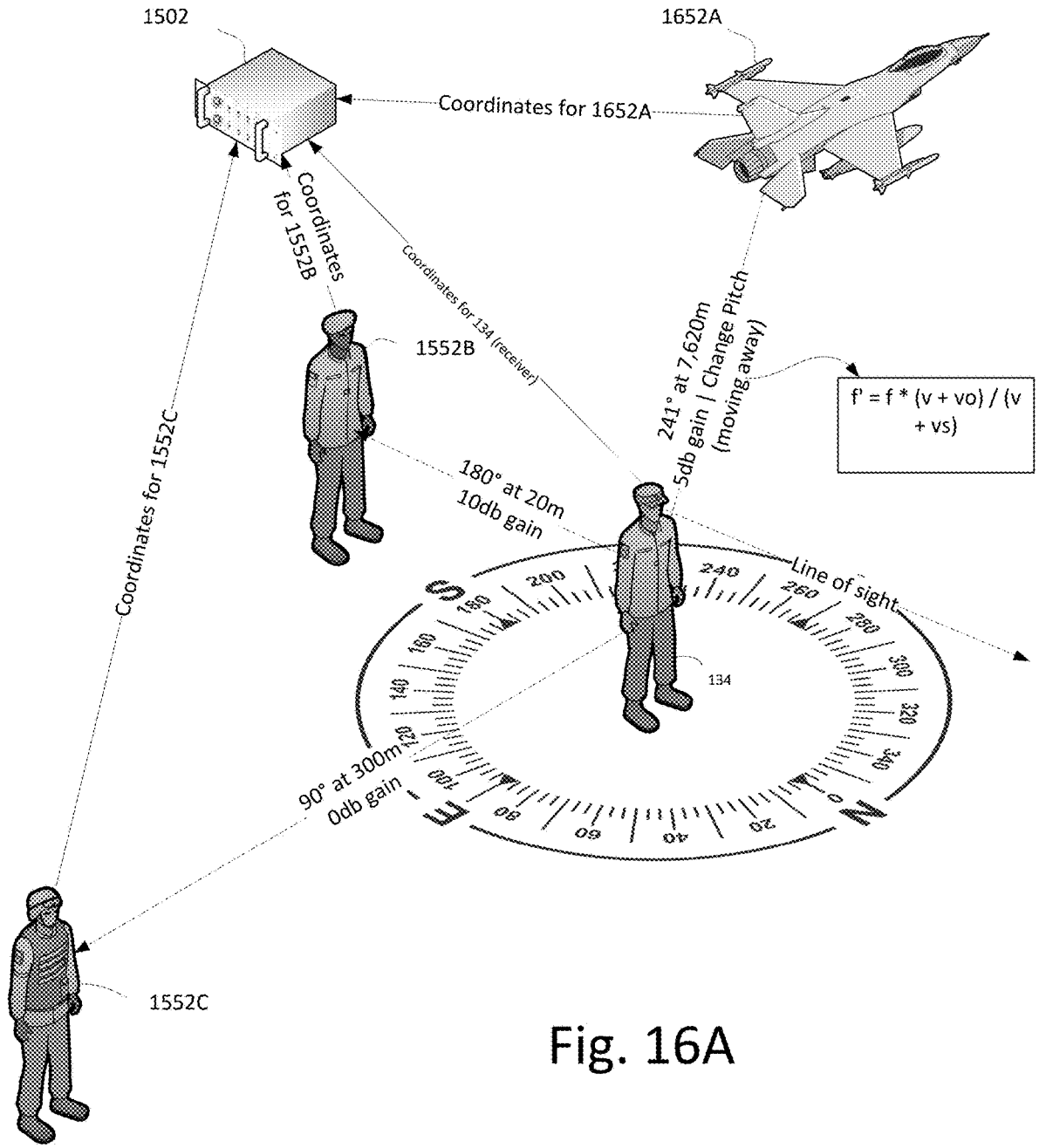
FIG. 16A is an isometric conceptual illustration of a soldier recipient of generative audio cues conveying relative distance, direction and relative movement of air support.

FIG. 16A pertains to the application of a system that conveys spatially explicit auditory cues through a headset worn by a recipient, denoted as 134. The system is designed to provide detailed positional information about multiple entities, including other personnel and assets, in the recipient's surroundings by transforming spatial information into unique audio signals. FIG. 16 illustrates a scenario where a soldier, denoted as 1552C, is situated 90 degrees from the recipient's forward-facing orientation at a distance of 300 meters. The spatial location of soldier 1552C is transformed into an auditory cue that is represented with a relative bearing of 90 degrees. This transformation utilizes Head-Related Transfer Functions (HRTFs), complex filters that replicate how an ear receives a sound from a specific location in space, to simulate the perceived direction and distance of the audio source. Another soldier, labeled as 1552B, is located 20 meters directly behind recipient 134, a spatial bearing of 180 degrees. The auditory cue for soldier 1552B is delivered at a louder volume than that for soldier 1552C, which implies a shorter distance according to psychoacoustic principles. The variation in volume between these two cues allows the recipient 134 to differentiate between the proximities of the two soldiers based on auditory perception alone.

The system also encompasses larger assets, such as a combat aircraft, labeled as 1652A, providing air support. The aircraft's known location is at a bearing of 241 degrees and an altitude of 7620 meters relative to recipient 134. Here, the altitude information is processed to an audible form, most likely by adjusting the spectral composition of the sound. Further complexity is added to the audio cue for combat aircraft 1652A through the integration of a Doppler effect, a shift in frequency and wavelength due to relative motion between the source and the observer. In this case, the Doppler effect signifies that the aircraft is moving away from the recipient, thereby providing essential temporal and spatial information about the aircraft's trajectory. This innovative application of spatial audio technology enables recipient 134 to gain an immediate and intuitive understanding of the dynamic environment without diverting visual attention, thus potentially increasing situational awareness and enhancing decision-making efficiency in complex scenarios. It's a prime example of how sophisticated audio engineering, rooted in psychoacoustics and spatial perception, can be applied in cutting-edge communication and information systems.

FIG. 16B shows an embodiment of the invention wherein flight lead 1652A has first wingman 1652B 30 meters at a 120-degree relative bearing to 1652A and a second wingman 1652C 1 nautical mile at a 250-degree relative bearing. Flight lead 1652A is in a forward position relative to first and second wingmen. Therefore, providing spatial audio cues is beneficial for operational awareness. It is important to note that the position may be requested by flight lead 1652A on-demand, upon intervals, constantly, concurrent with radio communications, prepended to communications or following communications. In the example shown, flight lead 1652 receives a right channel audio 1654 of first wingman 1652B via a right helmet speaker 1672A. Constant pings 1658 are at 500 Hz at half-second intervals conveying the relatively location (between left and right hemispheres) but also the distance using two audio modalities: (1) the ping frequency and (2) the ping interval. By contrast, second wingman 1652C is a full nautical mile away and to the relative left side of flight lead 1652A. Therefore, left helmet speaker 1678B broadcasts pings 1656 for second wingman 1652C at a longer interval 1670 of every ¾ a second and also at a lower frequency of 100 Hz.

FIG. 16C show a synthetic Doppler effect conveying dual audio modalities for distance. First wingman 1652B at $t_1$ is positioned 30 meters from flight lead 1652A. Accordingly, audio generated 1654 through $t_1$ is at a higher frequency and shorter interval. As first wingman 1652B moves to 500 meters from flight lead 1652A, both the frequency is lowered and the interval is lengthened. Finally, second wingman 1652B moves 5 nautical miles aft of flight lead 1652A but the presence is still conveyed at $t_3$ with longer intervals and lower frequency. It is anticipated by the present invention that a closing or distancing over a relative threshold speed (e.g., 100 knots) may change the audio gain to bring the change in position to the attention of flight lead 1652A, particularly if the presumption is to flight in formation.

Figure 17:
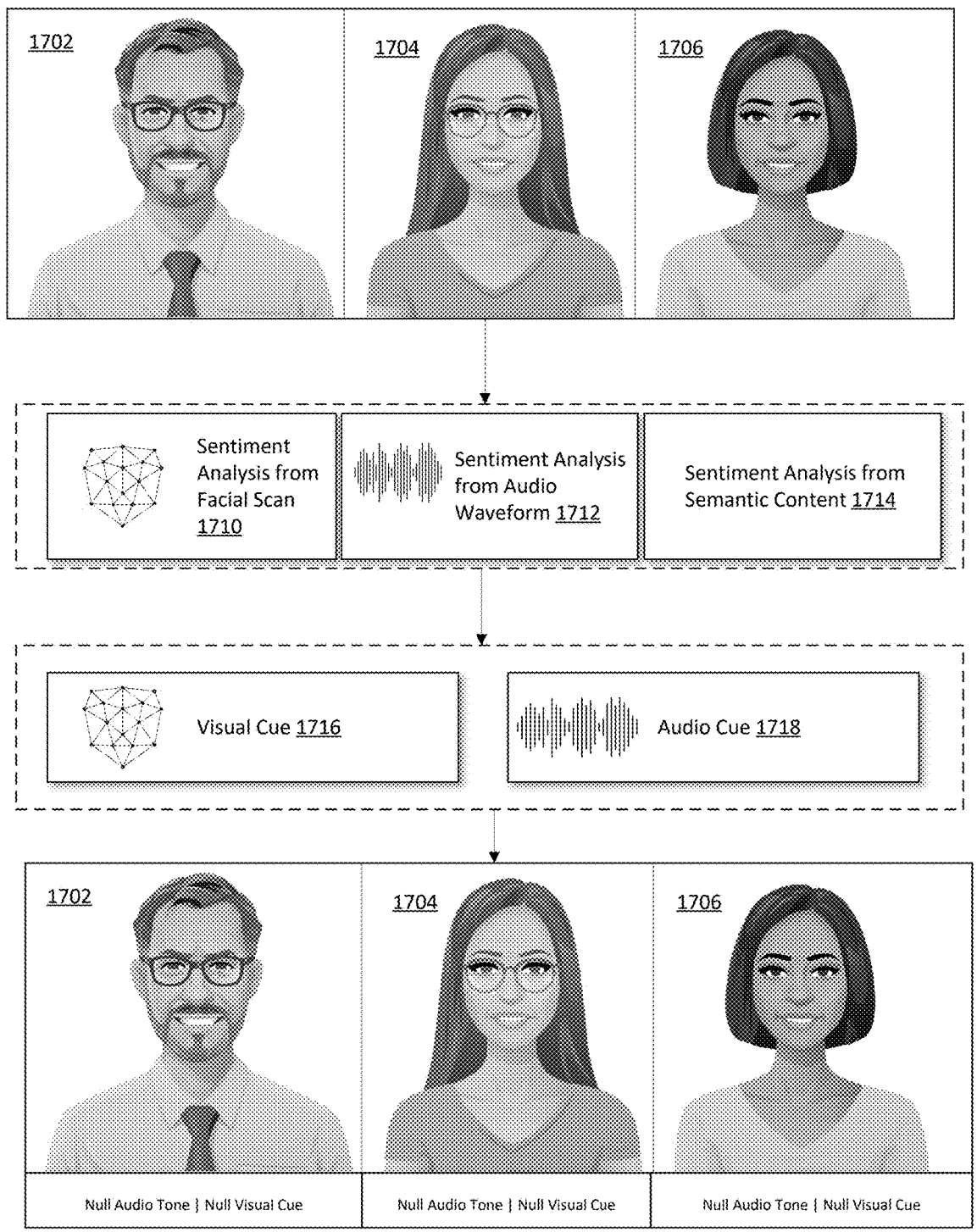
FIG. 17 is a conceptual view of an embodiment of the invention analyzing a multi-part video conference for party sentiment and returning a null or baseline result.
Figure 18:
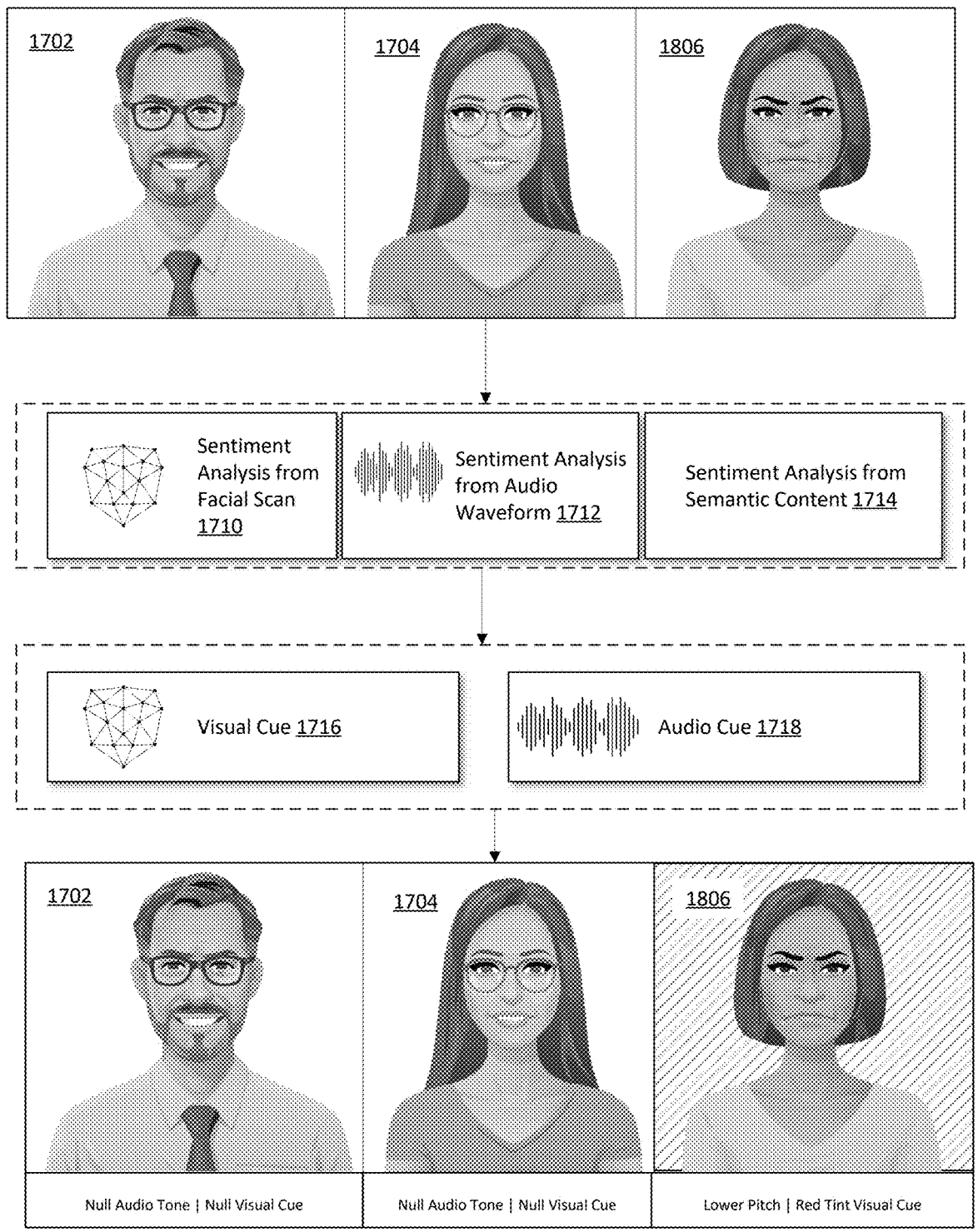
FIG. 18 is a conceptual view of an embodiment of the invention analyzing a multi-part video conference for party sentiment and returning a result applying generative audio and visual effects to convey sentiment in different modalities.

FIG. 17 and FIG. 18 illustrate a system designed to enhance the comprehension of non-verbal cues in a video conferencing context. The system aims to analyze multiple facets of each participant's communication and amplify specific features to assist users with visual or auditory impairments.

The video conferencing system captures three participants—first man 1702, first woman 1704, and second woman 1706—both visually and audibly. Three distinct modes of analysis are applied to each participant: (1) sentiment analysis from facial scan 1710; (2) sentiment analysis from audio waveform 1712 of their speech; and (3) sentiment analysis of the semantic content of their transcribed speech 1714. The analyzed sentiment data from these three sources can then be used to modulate the visual cues 1716 and/or audio cues 1718 in the audiovisual output.

In FIG. 17, all three participants show no emotive variation in facial expression, audio, or semantic content. Consequently, the system applies no amplification. It presents the situation as a control condition, wherein the system remains passive, having identified no need to amplify emotional cues. FIG. 18 expands on the example in FIG. 17. Here, the second woman (now participant 1806) exhibits a facial expression of disdain as detected by facial scan 1710, even though she remains silent in the video conference. This example demonstrates the system's capability to identify non-verbal emotional cues independently of auditory or semantic factors.

The detected sentiment—disdain—is amplified using both visual and audio cues. Visually, the background or overall tint of the participant 1806 is altered to a degree of red, a color often associated with negative emotions. This alteration serves as a visual cue 1716 that signals the detected sentiment to sighted users. In terms of audio cues 1718, the system applies a modulation to her voice, lowering the pitch. This modification is made even if the participant is silent; an artificially generated audio cue may be provided. The shift to a lower pitch can signify negative emotions, thereby providing an auditory counterpart to the visual cue.

The system's unique approach to amplifying emotional cues in a video conference is particularly valuable for users with low vision or blindness. By using generative audio modifications, it can convey emotional cues that are typically communicated visually. For instance, the change in pitch can enable a blind user to perceive the disdain expressed by participant 1806. This function is especially crucial given that tone and semantic content may not always sufficiently convey the emotion in the absence of visual cues.

The system, through the integration of visual and auditory sentiment analysis, ensures that all users, irrespective of their sensory capabilities, can effectively perceive and comprehend the emotional nuances of the participants in the conference.

Figure 19:
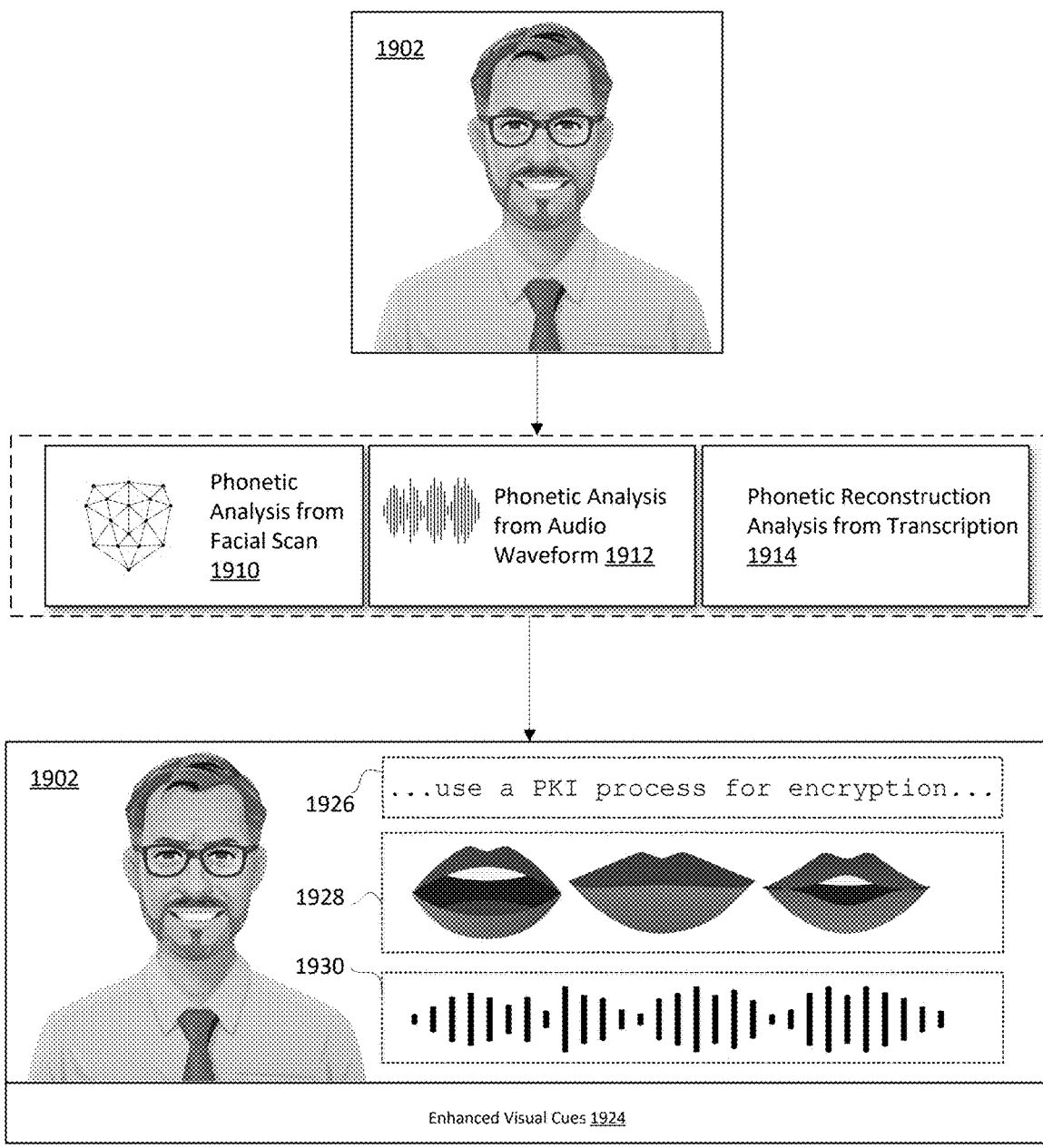
FIG. 19 is a conceptual view of processing an audiovisual feed of a speaker and returning generative visual cues to enhance the communicative signal to noise ratio for the recipient.

FIG. 19 elucidates a system and method for the application of three distinct modes of analysis on an audiovisual capture of a speaker. This system is implemented within a computing environment for the purpose of generating and appending enhanced visual cues to facilitate comprehension by recipients who may have auditory and/or sensory impairments.

Upon reception of the audiovisual capture of speaker 1902, the computing system begins by applying three simultaneous layers of analysis. The first analysis is phonetic analysis 1910 which is derived from facial scanning. This involves the computation of optical flow and the extrapolation of relevant phonetic data from the observed lip movements and other non-verbal cues provided by the speaker's facial expressions.

The second layer of analysis, phonetic analysis 1912, is conducted on the audio waveform associated with the captured audiovisual content. Advanced signal processing techniques are employed to transform the audio waveform into a time-frequency representation which is further analyzed to produce phonetic symbols or transcriptions. This is accomplished through the application of machine learning algorithms, specifically those tailored to the automatic recognition of speech.

The third analysis is the phonetic reconstruction 1914, which derives phonetic data from the transcription of the words spoken by speaker 1902. This requires automated speech recognition technology to convert the spoken words into a text format, from which further phonetic information can be extracted. The composite data from these three analyses are then integrated into a unified dataset.

The computing system then uses this unified dataset to generate enhanced visual cues (reference numeral 1924), comprising transcription 1926, phonetic indicia of the lip movements 1928, and a waveform graphic 1930. Transcription 1926 is a textual representation of the speaker's words, which is generated through automatic transcription of the audio content. Phonetic indicia of the lip movements 1928 is an animation of the speaker's lip movements, designed to correlate accurately with the phonetic content of the speaker's speech. The waveform graphic 1930 is a visual representation of the audio waveform that gives the recipient a visual understanding of the audio content's structure and emphasis points. It should be noted that lip movement may be derived in three approaches (or combination thereof):

Audio-Driven Lip Movement Generation. The process of using an audio file to generate corresponding lip movements involves the intricate orchestration of digital signal processing, phonetic classification, and computational modeling. Initially, the audio file is subjected to digital signal processing to isolate key features of the speech signal. These might include aspects such as pitch, volume, and timbre, but also more granular phonetic units like formants and phonemes. The processed audio file is then segmented into phonemes—the smallest distinct units of sound that differentiate words in a language. After the audio data is converted into these phonetic symbols, a mapping is established to match each phoneme to a specific 'viseme', a visual counterpart of a phoneme, representing the shape and movement of the lips and mouth. This mapping is a result of detailed modeling of human facial and articulatory dynamics, and can be implemented through a variety of machine learning techniques, including deep neural networks or hidden Markov models. The outcome is a sequence of visemes which, when animated in sync with the audio, generates lip movements that match the original speech.

Text-Driven Lip Movement Generation. Generating lip movements based on a text string also entails a transformation from linguistic units to visual articulatory gestures, albeit via a different pathway. The initial step involves text-to-speech (TTS) synthesis, wherein the input text string is analyzed and parsed into a sequence of phonemes using linguistic and phonological rules specific to the language in question. Furthermore, prosodic information, including stress, rhythm, and intonation, is derived from the text based on syntactic and semantic analysis. Similar to the audio-driven approach, a mapping is applied to convert each phoneme to a corresponding viseme. The generation of lip movements, however, needs to consider the prosodic information extracted from the text. Prosodic elements can significantly influence the articulatory dynamics of speech, thus it is crucial to integrate this information into the final visual representation. For instance, stressed syllables might be articulated with greater mouth opening or longer duration, resulting in exaggerated lip movements.

Lip Movement Transcription. The transcription of lip movements from video data constitutes an inverse problem to the generation of lip movements from audio or text. In this scenario, the task is to derive speech content from visual information, which typically involves visual feature extraction, machine learning, and language modeling. The video frames are first processed to detect and track the lips, using techniques such as active shape models or convolutional neural networks. These detected lip shapes and movements are then translated into a sequence of visemes, based on a predefined set of viseme categories. Machine learning models, trained on large datasets of synchronized audio-visual speech, can infer the most likely phoneme sequence that resulted in the observed visemes. However, due to the many-to-one mapping from phonemes to visemes (i.e., different phonemes can produce similar lip shapes), this inference can be challenging. Language models are often employed at this stage to constrain the phoneme sequence to linguistically plausible combinations, effectively leveraging the statistical patterns of the language. The final output is a transcription of the speech content, based on the visual information captured from the video of lip movements.

Depending on the capabilities of the computing system, a small delay buffer may be implemented to allow for the generation and application of these enhanced visual cues 1924. This is especially necessary when the processing power of the computing system is insufficient for real-time generation and application of these visual cues. Moreover, the visual cues are not limited to literal interpretations of the audio and phonetic content. These cues can also include more abstract visual representations such as ovals that synchronize with the audible speech of speaker 1902. These can be beneficial in simplifying the visual information, thereby aiding individuals with cognitive or sensory impairments.

In more advanced applications, the system can generate virtual human avatars that mimic the speaker's speech and facial expressions, providing a more immersive and intuitive visual representation of the speech content. Overlays using alpha channels can also be implemented in video presentations to display the visual cues in combination with the original audiovisual content. These methods can provide additional support for individuals with severe auditory or sensory impairments, facilitating their comprehension of the speech content.

Figure 20:
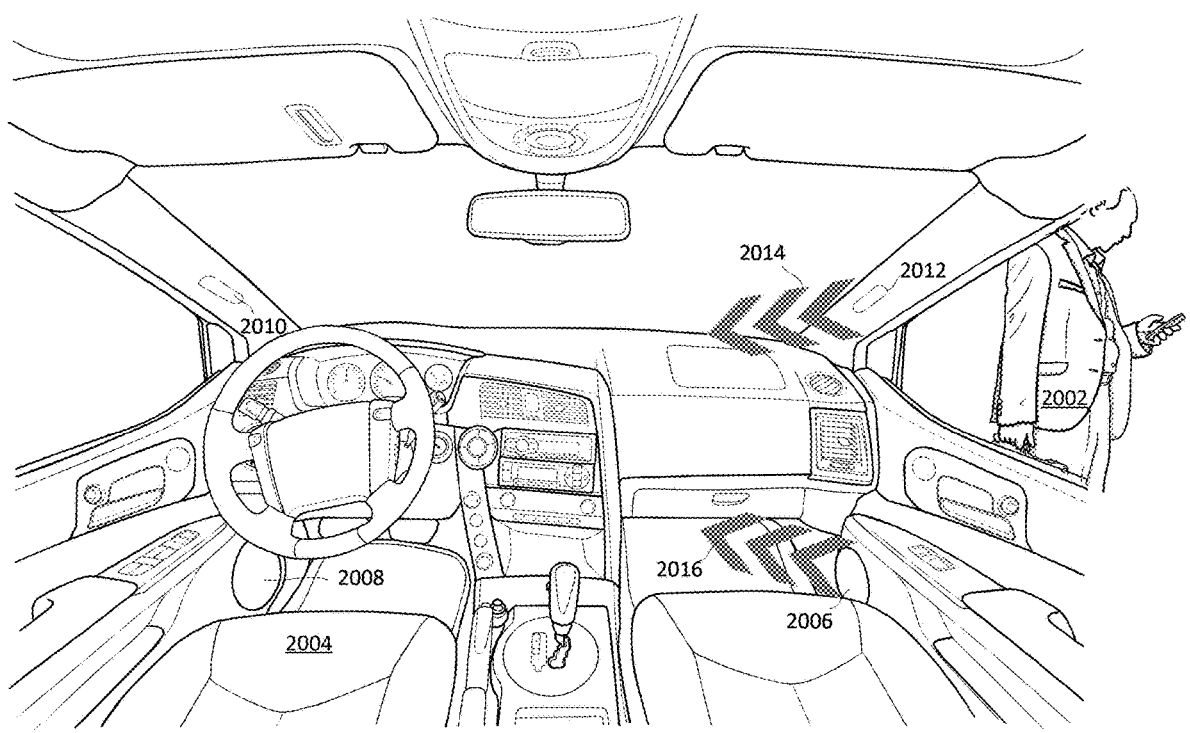
FIG. 20 is a rendering of a vehicle interior showing a detected object to the left and spatially generated audio indicating the presence of the object emanating from the right side vehicle speakers.

Finally, FIG. 20 shows an embodiment of the invention wherein object 2002 (a pedestrian) is detected by integrated proximity sensors in vehicle. Driver seat 2004 receives audio from speakers 2006, 2008, 2010 and 2012. However, because the proximity sensors detected object on the right side of the vehicle, instead of a non-directional alert, the invention directs the audio output warnings 2014 and 2016 through upper right speaker 2012 and lower right speaker 2006 respectively. This gives driver in seat 2004 immediate spatial awareness of the detected object 2002 and reduces the effort to locate the source of the warning by one-half.

Aspects of the present invention are described below with reference to flowchart illustrations and/or block diagrams of methods, apparatus (systems) and computer program products according to example embodiments of the invention. It will be understood that such illustrations and descriptions are intended to serve as non-limiting examples. It will also be understood that each block of the flowchart illustrations and/or block diagrams, and combinations of blocks in the flowchart illustrations and/or block diagrams, can be implemented by machine-readable program instructions.

Glossary of Claim Terms

Additive Noise means any unwanted disturbance in an electrical signal which is introduced while it is being captured, processed, transmitted, received, or reproduced and which alters the original signal. In the context of audio processing, additive noise can include background sounds such as static, hums, or other environmental sounds that interfere with the clarity of the desired audio signal. This type of noise is typically addressed using noise reduction techniques which filter out or minimize the unwanted components without significantly affecting the original signal. In digital communication systems, algorithms such as Wiener filtering, spectral subtraction, and adaptive filtering are commonly used to mitigate additive noise.

Algorithm means a set of rules or procedures for solving a problem or accomplishing a task, especially by a computer. Algorithms can be simple, such as sorting numbers in ascending order, or complex, like those used in machine learning for pattern recognition. They are fundamental to all areas of computer science and artificial intelligence, guiding the systematic processing of data to achieve a desired outcome. Algorithms are typically expressed in a step-by-step format and can be implemented in various programming languages. The efficiency of an algorithm is often measured in terms of its time complexity (how fast it runs) and space complexity (how much memory it uses).

Amplitude means the magnitude of change in the oscillating variable, with each oscillation within an oscillating system. In the context of sound, it refers to the maximum extent of a vibration or displacement of a sound wave, perceived as loudness. Amplitude is a key parameter in the study of waveforms, influencing both the intensity and energy of the sound wave. In digital audio processing, amplitude is represented as a numerical value in digital samples, and it can be manipulated to control volume, apply effects, or normalize audio levels. Amplitude modulation (AM) is a technique used in communication systems where the amplitude of a carrier signal is varied in accordance with the information signal.

Anthropomorphic Avatars mean virtual representations that exhibit human-like characteristics, used to enhance user interaction in digital environments. These avatars are designed to mimic human expressions, gestures, and movements, providing a more engaging and relatable user experience. Anthropomorphic avatars are widely used in applications such as virtual assistants, video games, virtual reality (VR), and augmented reality (AR). They are created using 3D modeling software and animated using techniques like motion capture and keyframe animation. The integration of artificial intelligence allows these avatars to respond dynamically to user inputs, enhancing the realism and interactivity of the experience.

Anthropomorphic means attributing human characteristics to non-human entities, often used in the context of representing objects or machines as having human form or traits. This concept is widely used in user interface design, robotics, and artificial intelligence to make interactions with machines more intuitive and relatable. Anthropomorphic design can involve creating avatars or virtual assistants that mimic human expressions, gestures, and behaviors to enhance user engagement and emotional connection. In robotics, it can involve designing robots with human-like features and movements to facilitate social interactions and improve acceptance among users.

Articulation means the physical production of particular speech sounds. It involves the movement and coordination of various speech organs, including the lips, tongue, teeth, and vocal cords. Proper articulation is necessary for clear and intelligible speech, affecting the way sounds are formed and perceived. In speech recognition and synthesis, understanding articulation patterns helps improve the accuracy of converting spoken words into text and vice versa. Techniques such as phonetic analysis and viseme mapping are used to study and replicate articulation in digital speech processing.

Audiovisual Communication means communication through visual aid and broadcasts such as televisions, telephones, and computers where information is transmitted digitally. This form of communication combines both visual elements (e.g., images, videos, animations) and audio elements (e.g., speech, sound effects, music) to convey messages more effectively. Audiovisual communication is essential in multimedia applications, educational content, virtual meetings, and entertainment. Technologies like video conferencing, streaming media, and interactive presentations rely on synchronized audiovisual components to provide a cohesive and engaging user experience.

Audio Gain means the adjustment of the amplitude or volume of an audio signal to simulate the distance of an entity relative to the recipient. In systems that generate spatially explicit auditory cues, audio gain is inversely proportional to the distance between the entity and the recipient. Closer entities produce higher gain (louder volume), while entities farther away produce lower gain (softer volume). This modulation of audio gain helps convey spatial awareness by making nearer entities sound more prominent compared to those further away.

Augmented Reality (AR) Equipment means hardware and software systems that overlay digital content onto the real world, enhancing the user's perception and interaction with their environment. AR equipment typically includes devices like AR glasses, headsets, and mobile devices equipped with cameras, sensors, and displays. These devices use computer vision and motion tracking to align virtual objects with the real world. Applications of AR equipment span various fields, including gaming, education, healthcare, and industrial maintenance. By providing contextual information and interactive experiences, AR equipment enhances productivity, learning, and entertainment.

Auvatar means an audio-based avatar system designed to provide a non-visual representation of individuals through distinct auditory signals. Each Auvatar employs a unique audio motif or set of tones that dynamically change to reflect the person's presence, movements, and emotional states. The system utilizes advanced audio processing techniques to create personalized sound profiles for each user. These profiles include a baseline motif that indicates the user's location in a virtual space, which plays softly in the background. The Auvatar system integrates real-time audio adjustments to reflect changes in the user's body posture and facial expressions. For instance, when a person exhibits an open posture indicating happiness, the Auvatar may produce harmonious and upbeat tones. Conversely, a slouched posture associated with sadness might trigger lower, more subdued tones. Emotional states such as anger or confusion can be represented through increased volume or dissonance in the audio motif. Auvatar activation occurs upon detecting significant changes in posture or facial expressions, using sensors and algorithms to monitor these changes. This feature alerts listeners to new interactions, such as someone entering or exiting a virtual space, through distinct auditory signals. Customization of Auvatars allows users to modify their audio profiles, adding layers of personalization that can include various emotional themes and moods.

Control Signals mean signals used in electronic devices to control the functioning of the hardware. These signals can be digital or analog and are used to manage the operation of various components within a system. In digital systems, control signals often include clock pulses, enable signals, read/write commands, and status flags that coordinate the timing and sequence of operations. In audio and video equipment, control signals can manage playback, recording, volume adjustment, and channel selection. Proper design and management of control signals are critical for ensuring the reliable and efficient performance of electronic devices.

Convolutional Neural Network (CNN) means a class of deep neural networks, most commonly applied to analyzing visual imagery. CNNs are particularly effective for tasks like image recognition, object detection, and facial recognition due to their ability to capture spatial hierarchies in images through the use of convolutional layers. Each convolutional layer applies a set of filters to the input image, detecting features such as edges, textures, and patterns. CNNs also include pooling layers to reduce the dimensionality of the data, making the computation more efficient. Advanced CNN architectures like ResNet, Inception, and VGG have achieved state-of-the-art performance in various visual tasks.

Directional Sensor means a sensor device configured to detect and measure the direction in which an entity is oriented or moving. This includes sensors that can be mounted on an entity, such as a head-mounted sensor for determining visual focus or an armament-mounted sensor for detecting the direction of a weapon. Directional sensors provide critical data used in systems that generate spatially explicit auditory cues, enabling the recipient to perceive the relative direction and focus of entities based on their movements and orientations.

Encoding means the process of converting data from one form to another. This process is fundamental in digital communication, data storage, and media streaming. For example, in audio and video encoding, raw data is compressed into a more efficient format (e.g., MP3, MP4) to reduce file size and facilitate transmission over networks. Encoding involves various algorithms and codecs (coder-decoder) that determine how data is transformed and compressed. The choice of encoding method affects the quality, compatibility, and efficiency of the data representation. Decoding is the reverse process, converting the encoded data back to its original form for playback or analysis.

Facial Expressions mean the movements or positions of the face that express one's emotions or reactions. Facial expressions are an important aspect of non-verbal communication, conveying a wide range of emotions such as happiness, sadness, anger, surprise, and fear. In the context of computer vision and artificial intelligence, facial expression recognition involves detecting and interpreting these expressions using algorithms and machine learning models. Techniques such as feature extraction, facial landmark detection, and convolutional neural networks (CNNs) are used to analyze facial expressions from images or video frames. Applications include emotion-aware systems, human-computer interaction, and security.

Focus Trajectory means the visual focus orientation of an entity, determined by the direction in which the entity is facing or directing its attention. This can be resolved by various sensors, including head-mounted directional sensors, which track the entity's line of sight. The focus trajectory is used to determine the relative bearing of the entity's visual focus with respect to a recipient or another entity, influencing the generation of auditory cues that simulate the perceived direction and attention of the entity. For example, a visual focus trajectory facing directly towards the recipient would be indicated by a higher frequency auditory signal, whereas facing away would be indicated by a lower frequency signal.

Generative AI means a type of artificial intelligence technology that utilizes machine learning tools to generate data itself. Unlike traditional AI that follows predefined rules, generative AI models can create new content, such as images, text, music, or even synthetic data, by learning patterns from existing datasets. Techniques like Generative Adversarial Networks (GANs) and Variational Autoencoders (VAEs) are commonly used in generative AI. These models have applications in various fields, including art creation, data augmentation, natural language processing, and virtual environment generation. Generative AI can enhance creativity, automate content production, and provide new solutions for complex problems.

Long Short-Term Memory networks (LSTMs) mean a type of recurrent neural network (RNN) designed to learn long-term dependencies. LSTMs address the vanishing gradient problem found in traditional RNNs, making them effective for tasks that require learning from long sequences of data. LSTMs use gates to control the flow of information, retaining relevant data while discarding unnecessary information. Applications include language modeling, machine translation, speech recognition, and time series forecasting. LSTMs are capable of capturing temporal patterns and dependencies, making them a powerful tool for sequential data analysis.

Machine Learning means a method of data analysis that automates analytical model building. It's a branch of artificial intelligence based on the idea that systems can learn from data, identify patterns, and make decisions with minimal human intervention. Machine learning algorithms can be classified into supervised learning, unsupervised learning, and reinforcement learning, each serving different purposes. Supervised learning involves training a model on labeled data, unsupervised learning finds hidden patterns in unlabeled data, and reinforcement learning optimizes actions based on feedback from the environment. Common applications include predictive analytics, image and speech recognition, recommendation systems, and autonomous systems.

Multiplicative Noise means noise that is not additive but multiplies the signal. It represents random fluctuations in the gain of a system, rather than the addition of unwanted signals. This type of noise is particularly challenging to address because it varies with the signal amplitude. In imaging systems, multiplicative noise often appears as speckle noise, common in radar and ultrasound images. In communication systems, multiplicative noise can distort the signal amplitude and phase, complicating the demodulation process. Techniques to mitigate multiplicative noise include statistical filtering, adaptive filtering, and wavelet transform methods, which aim to separate the noise component from the useful signal.

Naive Bayes means a family of probabilistic algorithms based on applying Bayes' theorem with strong independence assumptions between the features. Naive Bayes classifiers are highly scalable, requiring a number of parameters linear in the number of variables (features) in a learning problem. They are particularly effective for text classification tasks such as spam detection, sentiment analysis, and document categorization. Despite the simplifications, Naive Bayes classifiers perform well in many real-world applications due to their simplicity, speed, and effectiveness, especially when the independence assumption holds true or when features are conditionally independent given the class.

Natural Language Processing means a subfield of artificial intelligence that focuses on enabling computers to understand and process human language. NLP involves the application of computational techniques to analyze and synthesize natural language text and speech. Core tasks in NLP include tokenization, parsing, sentiment analysis, machine translation, and named entity recognition. Techniques such as machine learning, deep learning, and linguistic rule-based approaches are used to develop NLP models. NLP is important for applications like chatbots, voice assistants, translation services, and information retrieval, enabling more intuitive and effective human-computer interactions.

Natural Language Toolkit (NLTK) means a leading platform for building Python programs to work with human language data. NLTK provides easy-to-use interfaces to over 50 corpora and lexical resources, along with a suite of text processing libraries for classification, tokenization, stemming, tagging, parsing, and semantic reasoning. It also includes wrappers for industrial-strength NLP libraries. NLTK is widely used for teaching and research in computational linguistics and natural language processing. Its comprehensive documentation and active community make it an invaluable resource for developing and deploying NLP applications.

Omnidirectional Microphone means a type of microphone that captures sound equally from all directions. Unlike unidirectional microphones, which pick up sound from a specific direction, omnidirectional microphones are designed to record ambient sounds, making them ideal for capturing natural and realistic audio environments. They are commonly used in applications such as conference calls, field recordings, and surveillance. Omnidirectional microphones are also employed in arrays for spatial audio capture, providing a 360-degree sound field. Their design minimizes proximity effect and offers a balanced frequency response, making them versatile tools for various audio recording scenarios.

Phonemes mean any of the perceptually distinct units of sound in a specified language that distinguish one word from another. Phonemes are the smallest sound units that can change the meaning of a word, such as /b/ and /p/ in "bat" and "pat". Phonemes are classified into consonants and vowels, each characterized by specific articulatory features. In speech processing, phoneme recognition is essential for tasks like automatic speech recognition (ASR) and text-to-speech (TTS) synthesis. Techniques like Hidden Markov Models (HMMs) and deep learning are used to model phonemes, improving the accuracy of speech-related applications.

Physical Entity means a non-virtual, physical manifestation of an object. This may comprise, for example, a human, aircraft, land vehicle or any other tangible object.

Recurrent Neural Network (RNN) means a class of artificial neural networks where connections between nodes form a directed graph along a temporal sequence. This makes RNNs particularly suitable for processing sequential data such as time series, speech, and text. RNNs have a memory component that retains information from previous inputs, allowing them to learn temporal dependencies. Variants of RNNs, such as Long Short-Term Memory (LSTM) and Gated Recurrent Unit (GRU), address the issue of long-term dependencies and vanishing gradients, making them more effective for tasks like language modeling, machine translation, and speech recognition.

Semantic means relating to meaning in language or logic. Semantics focuses on the interpretation and understanding of words, phrases, and sentences in context. In natural language processing (NLP), semantic analysis involves determining the meaning and relationships of words within a text. Techniques like semantic parsing, word embeddings (e.g., Word2Vec, GloVe), and ontologies are used to capture semantic information. Semantic analysis is needed for tasks such as information retrieval, machine translation, and question answering, enabling systems to understand and generate meaningful responses based on the input text.

Sentiment Analysis means the process of computationally identifying and categorizing opinions expressed in a piece of text, especially to determine whether the writer's attitude towards a particular topic is positive, negative, or neutral. Sentiment analysis combines natural language processing (NLP), text analysis, and computational linguistics to extract subjective information from source materials. Techniques used in sentiment analysis include machine learning models like Naive Bayes, Support Vector Machines (SVM), and deep learning models such as Long Short-Term Memory (LSTM) networks and Transformers. Applications include market analysis, customer service, social media monitoring, and opinion mining.

Signal-to-Noise Ratio (SNR) means a measure used in science and engineering that compares the level of a desired signal to the level of background noise. SNR is defined as the ratio of signal power to the noise power. It is typically expressed in decibels (dB). A higher SNR indicates a clearer and stronger signal with less noise interference. SNR is a critical parameter in communication systems, audio processing, and imaging. Techniques to improve SNR include signal amplification, noise filtering, and error correction methods, enhancing the quality and reliability of the transmitted or received signal.

Speech Recognition means the ability of a machine or program to identify words and phrases in spoken language and convert them to a machine-readable format. Speech recognition systems use algorithms and models to process audio signals, identify phonemes, and construct words and sentences from these basic units. Techniques like Hidden Markov Models (HMMs), deep learning, and neural networks are commonly used. Applications include voice-activated assistants, transcription services, and accessibility tools for individuals with disabilities. Speech recognition technology continues to advance, aiming for higher accuracy, better handling of diverse accents, and real-time processing capabilities.

Support Vector Machines (SVM) mean supervised learning models used for classification and regression analysis. SVMs work by finding the hyperplane that best divides a dataset into classes. This hyperplane is determined by maximizing the margin between the closest data points of the classes, known as support vectors. SVMs are effective in high-dimensional spaces and are used in various applications, including image recognition, text classification, and bioinformatics. They can be extended to handle non-linear classification using kernel functions, transforming the input space into higher dimensions where a linear separation is possible.

Text-to-Speech (TTS) means a technology that converts written text into spoken words. TTS systems use speech synthesis techniques to generate human-like speech from text input. These systems can vary in complexity from basic concatenative synthesis, which strings together pre-recorded segments of speech, to advanced neural network-based synthesis, which generates natural-sounding speech using deep learning models. TTS is used in various applications, including virtual assistants, accessibility tools for visually impaired individuals, and automated customer service systems. TTS technology improves user interaction by providing an auditory output of textual information.

Transcript means a written or printed version of material originally presented in another medium. In the context of speech and audio processing, a transcript refers to the textual representation of spoken words. Transcription can be done manually or automatically using speech recognition software. Transcripts are essential for creating records of meetings, interviews, and broadcasts. They are also used in natural language processing tasks like sentiment analysis, information retrieval, and machine translation. High-quality transcription requires accurate capture of spoken words, including context and nuances, to ensure the fidelity of the original speech.

Transformers Model means a deep learning model architecture introduced in the paper "Attention is All You Need"

by Vaswani et al. The Transformer model relies entirely on self-attention mechanisms to draw global dependencies between input and output. It has significantly improved performance in natural language processing tasks such as machine translation, text summarization, and question answering. Transformers do not require sequential data processing, making them more parallelizable and efficient than RNNs. Key models like BERT, GPT, and T5 are based on the Transformer architecture, demonstrating state-of-the-art performance in various NLP benchmarks.

Translation means the process of translating words or text from one language into another. Translation involves not only converting words but also preserving the meaning, context, and nuances of the original language. Machine translation systems use techniques like statistical models, rule-based approaches, and neural networks to perform translations. Advanced models like neural machine translation (NMT) use deep learning to provide more accurate and fluent translations. Translation is critical for global communication, enabling understanding across different languages and cultures in applications such as multilingual websites, real-time translation services, and international business communications.

Visemes mean the visual equivalent of phonemes. These are facial expressions and movements of the mouth that correspond to a particular speech sound. Visemes are useful for lip-reading and audiovisual speech synthesis. In speech recognition and animation, visemes help create realistic and synchronized visual representations of spoken language. Techniques like facial motion capture and computer animation are used to model and render visemes. Applications include virtual avatars, video game characters, and communication aids for individuals with hearing impairments. Accurate viseme mapping improves the naturalness and intelligibility of synthesized speech in audiovisual systems.

Visual Cues mean any information received by the eyes that contributes to an understanding or interpretation of the surroundings. Visual cues include facial expressions, body language, gestures, and environmental context. In human-computer interaction, visual cues are used to enhance the user experience by providing intuitive feedback and guidance. For example, in augmented reality (AR) and virtual reality (VR), visual cues help users navigate and interact with digital environments. In communication systems, visual cues complement auditory information, improving comprehension and engagement. Techniques like computer vision and animation are used to create and analyze visual cues in digital applications.

Visual Representations mean graphical displays that attempt to display complex data meaningfully. Visual representations include charts, graphs, diagrams, and animations used to convey information clearly and efficiently. In the context of data visualization, visual representations help users understand patterns, trends, and relationships within the data. Techniques like infographics, interactive dashboards, and 3D modeling are used to create visual representations. In communication systems, visual representations enhance the transmission of information by providingvisual context and emphasis. Tools like Tableau, D3.js, and Matplotlib are commonly used for creating visual representations.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A system for generating spatially explicit auditory cues for a recipient, the system comprising:
 a. a processor configured to receive real-time location data of at least one physical entity relative to:
  i. a spatial position of the recipient, and
  ii. a visual sight orientation of the recipient, wherein the location data includes directional bearing and distance;
 b. an audio generation module configured to transform the location data into an audio signal corresponding to the at least one physical entity using a Head-Related Transfer Function (HRTF) to simulate perceived direction and distance; and
 c. an output device configured to present the audio signals to the recipient in a spatially explicit manner, such that the recipient perceives the relative direction and distance of the physical entity.

2. The system of claim 1, wherein the location data is derived from a combination of inputs selected from the group consisting of Global Positioning System (GPS) data, radio signals, sound signals, optically received data, and audibly received data.

3. The system of claim 1, wherein the audio generation module adjusts the volume of the audio signals based on the distance of the entity from the recipient, wherein an amplitude of the audio signal increases as the entity moves closer to the recipient.

4. The system of claim 1, further comprising a Doppler effect integration module configured to adjust the frequency and corresponding wavelength of the audio signals to simulate relative motion between the recipient and the entity.

5. The system of claim 1, wherein the output device is a headset worn by the recipient, configured to provide positional information about the entity in the recipient's surroundings.

6. The system of claim 5, further comprising an augmented reality display worn by the recipient, configured to display the directional source of the entity.

7. The system of claim 1, wherein the processor is further configured to generate audio cues for physical entities located above ground, with altitude information processed to an audible form by adjusting the spectral composition of the sound.

8. The system of claim 1, wherein the recipient is airborne and the processor is further configured to generate audio cues for ground-based physical entities, with altitude information processed to an audible form by adjusting the spectral composition of the sound.

9. The system of claim 1, further comprising a predefined distance boundary, wherein any physical entity located beyond the predefined distance boundary is muted by the system.

10. The system of claim 9, wherein the system is configured to apply a plurality of context-sensitive distance boundaries, each boundary being selected in accordance with a category of the physical entity.

11. The system of claim 1, wherein the recipient's visual sight orientation is monitored in real-time, and the audio generation module updates the HRTF-processed audio signal in response to changes in the orientation.

12. A system for generating spatially explicit auditory cues for a recipient, the system comprising:
 a. a processor configured to receive real-time location data of at least one physical entity relative to a spatial position and visual sight orientation of the recipient, wherein the location data includes a directional bearing, a distance and a focus trajectory of the entity;
b. an audio generation module configured to transform the location data into an audio signal corresponding to the physical entity to simulate the perceived direction, the distance and the focus trajectory of the physical entity; and
c. an output device configured to present the audio signals to the recipient in a spatially explicit manner, allowing the recipient to perceive the relative direction, distance and focus trajectory of the entity.

13. The system of claim 12 wherein the focus trajectory of the entity is defined by a visual focus orientation of the physical entity, the orientation being detected by a head-mounted directional sensor on the entity.

14. The system of claim 12 wherein the focus trajectory of the entity is defined by a firing direction of an armament of the physical entity, the firing direction being detected by a directional sensor mounted on the armament.

15. The system of claim 12 wherein the audio generation module varies a frequency component of the audio signal in accordance with an angle between the focus trajectory of the physical entity and a line of sight of the recipient, wherein the frequency increases as the focus trajectory aligns toward the recipient ($\approx 0°$) and decreases as the focus trajectory turns away ($\approx 180°$).

16. A system for generating spatially explicit auditory cues for a recipient, the system comprising:
a. a processor configured to receive real-time location data of at least one physical entity relative to a spatial position and visual sight orientation of the recipient, wherein the location data includes a directional bearing, a distance and a visual focus trajectory of the entity, the visual focus trajectory resolved by a directional sensor on the entity;
b. an audio generation module configured to transform the location and focus data into an audio signal corresponding to the entity to simulate perceived direction, distance and focus trajectory, where the audio signal comprises:
   i. an audio interval corresponding to distance wherein an entity closer to the recipient produces audio pulses with shorter intervals and an entity farther from the recipient produces audio pulses with longer intervals;
   ii. an audio gain corresponding to distance wherein an entity closer to the recipient produces an audio signal with higher gain and an entity farther from the recipient produces an audio signal with lower gain, wherein the audio gain ranges from −20 decibels to +20 decibels;
   iii. a frequency level in the audio signal, the frequency level having a range bounded by a minimum frequency between about 50 Hz and about 150 Hz and a maximum frequency between about 800 Hz and about 1,200 Hz, wherein an entity whose visual focus trajectory is aligned ($\approx 0°$) with the recipient's line of sight produces the maximum frequency, and an entity whose trajectory is opposite ($\approx 180°$) produces the minimum frequency; and
c. an output device configured to present the audio signal to the recipient in a spatially explicit manner, such that the recipient perceives the relative direction, distance and focus trajectory of the physical entity.

* * * * *